(12) United States Patent
Roemmelmayer et al.

(10) Patent No.: US 10,742,143 B2
(45) Date of Patent: Aug. 11, 2020

(54) SENSORLESS MOTOR CONTROL

(71) Applicant: Infineon Technologies AG, Neubiberg (DE)

(72) Inventors: Christopher Roemmelmayer, Munich (DE); Maximilian Burggraf, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/163,014

(22) Filed: Oct. 17, 2018

(65) Prior Publication Data

US 2020/0127587 A1    Apr. 23, 2020

(51) Int. Cl.
*H02P 6/185* (2016.01)
*H02P 6/26* (2016.01)
*H02P 6/28* (2016.01)

(52) U.S. Cl.
CPC ............... *H02P 6/185* (2013.01); *H02P 6/26* (2016.02); *H02P 6/28* (2016.02); *H02P 2203/03* (2013.01)

(58) Field of Classification Search
CPC ......... H02P 6/185; H02P 6/26; H02P 2203/03
See application file for complete search history.

(56) References Cited

U.S. PATENT DOCUMENTS

2013/0328510 A1* 12/2013 Sato .................. H02P 6/06
318/400.04
2016/0233812 A1* 8/2016 Lee .................. H02P 21/34

OTHER PUBLICATIONS

Wang, et al., "Sensorless Control Technology for Single Phase BLDCM Based on the Winding Time-sharing Method," 31st Annual Conference of IEEE Industrial Electronics Society, Nov. 2005, pp. 1732-1736.
Iepure, et al., "Improved state observers for sensorless single phase BLDC-PM motor drives," IECON 2010—36th Annual Conference on IEEE Industrial Electronics Society, Nov. 2010, pp. 870-875.
Terzic et al., "Design and Implementation of the Extended Kalman Filter for the Speed and Rotor Position Estimation of Brushless DC motor," IEEE Transactions on the Industrial Electronics, vol. 48, No. 6, Dec. 2001, pp. 1065-1073.
Chang, et al., "A New Sensorless Starting Method for Brushless DC Motors without Reversing Rotation," 2007 IEEE Power Electronics Specialist Conference, Jun. 2007, pp. 619-624.
Ahmed, "Investigations into the Improvement of Single Phase Permanent Magnet Brushless DC Motor," Leicester, University of Leicester, 2011, 211 pp.

(Continued)

*Primary Examiner* — Cortez M Cook
(74) *Attorney, Agent, or Firm* — Shumaker & Sieffert, P.A.

(57) ABSTRACT

A controller circuit for a brushless direct current (BLDC) motor may be configured to estimate a rotor position of the BLDC motor and apply a constant start-up voltage to a stator winding of the BLDC motor using the estimated rotor position until a current at the stator winding corresponds to a local minimum current. The controller circuit may be further configured to, in response to the current at the stator winding corresponding to the local minimum current, allow commutation of the current at the stator winding, calculate the rotor position in response to allowing the commutation of the current at the stator winding, and commutate the current at the stator winding using the calculated rotor position.

20 Claims, 12 Drawing Sheets

(56) References Cited

OTHER PUBLICATIONS

Microchip Technology Inc, "Brushless DC (BLDC) Motor Fundamentals," URL: http://ww1.microchip.com/downloads/en/AppNotes/00885a.pdf, access date Sep. 20, 2018, 20 pp.

Microchip Technology Inc, "Brushed DC Motor Fundamentals," URL: http://ww1.microchip.com/downloads/en/AppNotes/00905B.pdf, access date Sep. 20, 2018, 10 pp.

Iepure, et al., "Hybrid I-f Starting and Observer-Based Sensorless Control of Single-Phase BLDC-PM Motor Drives," IEEE Transactions on Industrial Electronics, Sep. 2012, vol. 59, No. 9, pp. 3436-3444.

Monolithic Power Systems, Inc., "Brushless DC Motor Fundamentals," URL: https://media.monolithicpower.com/document/Brushless_DC_Motor_Fundamentals.pdf, access date Sep. 20, 2018, 19 pp.

Wang, et al., "Starting Methods for Hall-less Single Phase BLDC Motor," 31st Annual Conference of IEEE Industrial Electronics Society, 2005, IECON Nov. 2005, pp. 1605-1609.

Hou, et al., "Vector Control of Single Phase Brushless DC motor," 2016 19th International Conference on Electrical Machines and Systems (ICEMS) Nov. 2016, 5 pp.

Schroedl, "Sensorless Control of AC Machines at Low Speed and Standstill Based on the "INFORM" Method," Bd. 1., Industry Applications Conference, Oct. 1996, Conference Record of the 1996 IEEE, pp. 270-277.

Chiu, et al., Properties of Cogging Torque, Starting Torque, and Electrical Circuits for the Single-Phase Brushless DC Motor, IEEE Transactions on Magnetics, vol. 44, No. 10, Oct. 2008, pp. 2317-2323.

Buechner, et al., "Nonlinear Modeling and Identification of a DC-Motor with Friction and Cogging," IECON 2013, 39th Annual Conference of the IEEE Industrial Electronics Society, Nov. 2013, pp. 3621-3627.

Maxon motor AG: Motordaten und Betriebsbereiche von DC Motoren, URL: https://www.maxonmotor.ch/medias/sys_master/root/8797816094750/maxonMotorDataHandzettel.pdf?attachment=true, access date Sep. 20, 2018, 14 pp.

Chiu, et al., "Optimal Driving Efficiency Design for the Single-Phase Brushless DC Fan Motor," IEEE Transactions on Magnetics, Apr. 2010, vol. 46, No. 4, pp. 1123-1130.

Gruebler, et al., "Improved Switching Strategy for a Single-Phase Brushless Direct Current Motor and its Impact on Motor Efficiency," 2017 IEEE International Electric Machines and Drives Conference, Aug. 2017, 6 pp.

Acarnley, et al., "Review of Position-Sensorless Operation of Brushless Permanent-Magnet Machines," IEEE Transactions on Industrial Electronics, Apr. 2006, vol. 53, No. 2, pp. 352-362.

Iepure, et al., "Novel Position and Speed Estimator for PM Single Phase Brushless D.C. Motor Drives: Validation with Experiments," 2010 IEEE International Symposium on Industrial Electronics, Jul. 2010, pp. 1389-1394.

Bado et al. "Effective Estimation of Speed and Rotor Position of a PM Synchronous Motor Drive by a Kalman Filtering Technique," Power Electronics Specialist Conference, Jul. 1992, 23rd Annual IEEE, vol. 2, pp. 951-957.

Jang, et al., "Position detection and start-up algorithm of a rotor in a sensorless BLDC motor utilising inductance variation," IEE Proceedings—Electric Power Applications, vol. 149, No. 2, Mar. 2002, pp. 137-142.

\* cited by examiner

SENSORLESS MOTOR CONTROL

TECHNICAL FIELD

This disclosure relates to electric motors, and more particularly, to techniques and circuits associated with single phase brushless direct current (BLDC) motor control.

BACKGROUND

Operation of brushless direct current (BLDC) motors may be performed by a controller. The controller controls a rotor rotation of the BLDC motor based on a position of the rotor relative to a stator winding of the BLDC motor. In some examples, the controller may infer the position of the rotor relative to stator coils without relying on rotary sensors, such as Hall Effect sensors. In these examples, the controller that does not rely on Hall Effect sensors may be referred to as a "sensorless" controller.

SUMMARY

The disclosure describes techniques, devices, and systems for improving operation of a brushless direct current (BLDC) motor that estimates the rotor position, rather than relying on Hall Effect sensors to directly measure rotor position. For example, a controller circuit may use a back electromotive force (hereinafter, "back-emf") voltage to determine the rotor position of the BLDC motor. However, in some instances, the back-emf voltage may be difficult to measure until the rotor rotation of the BLDC motor exceeds a minimum speed.

In some examples, an open-loop voltage over frequency (V/f) control and/or open-loop current over frequency (I/f) control may be used to start the BLDC motor without relying on the back-emf voltage. However, with such open-loop control there may be a comparatively high risk of failure for accelerating the BLDC motor to achieve the minimum speed suitable for detecting back-emf voltage of undriven coils of the BLDC motor.

In accordance with one or more aspects of this disclosure, rather than relying on open loop control for startup, controller circuitry may estimate a rotor position of the BLDC motor and apply a constant start-up voltage to a stator winding of the BLDC motor using the estimated rotor position of the BLDC motor. Accordingly, a risk of failure of the BLDC motor and/or the controller circuitry during a start-up state of the BLDC motor may be minimized while minimizing a complexity and cost compared with systems that do not use an estimated rotor position when applying a constant start-up voltage.

Contrary to three phase motors, a back-emf voltage may not be measurable while a single phase BLDC controller commutates current at a stator winding of a BLDC motor. As such, to measure the back-emf voltage across the stator winding, some BLDC motor controllers may apply a blanking period where current at the stator winding is completely dissipated to measure the back-emf voltage across an ohmic resistance of the stator winding. However, such blanking periods hinder the BLDC motor controller from driving the BLDC motor to develop maximum torque and speed.

In accordance with one or more aspects of this disclosure, rather than relying on blanking periods to measure a back-emf voltage, controller circuitry may estimate the back-emf voltage using current at a stator winding of the BLDC motor. Accordingly, a back-emf voltage may be continuously deduced without interrupting normal operation of the BLDC motor, which may permit a BLDC controller to drive the BLDC motor to a maximum torque and speed faster than BLDC controllers that measure the back-emf using blanking periods.

Some BLDC motor controllers may use flux observer control that uses a flux of the permanent magnets in the stator winding of the BLDC motor to estimate a rotor position of the BLDC motor. To account for ramp drift and direct current (DC) offset, some BLDC controllers use total flux as an input to a proportional-integral (PI) controller. However, the PI controller may not be fast enough to respond to fast changing frequencies that may occur during dynamic scenarios such as acceleration of the BLDC motor.

In accordance with one or more aspects of this disclosure, rather than relying on total flux at a BLDC motor to determine compensation for ramp drift and DC offset, controller circuitry may use a minima and maxima flux of the permanent magnets in the stator winding of the BLDC motor to determine compensation for the drift used for estimating a rotor position of the BLDC motor. Accordingly, rotor position of the BLDC motor may be estimated with improved accuracy compared to BLDC motor controllers that rely on total flux at a BLDC motor, particularly during dynamic scenarios such as acceleration of the BLDC motor.

In some examples, the disclosure is directed to a controller circuit for a BLDC motor, the controller circuit being configured to: estimate a rotor position of the BLDC motor; apply a constant start-up voltage to a stator winding of the BLDC motor using the estimated rotor position until a current at the stator winding corresponds to a local minimum current; in response to the current at the stator winding corresponding to the local minimum current, allow commutation of the current at the stator winding; calculate the rotor position in response to allowing the commutation of the current at the stator winding; and commutate the current at the stator winding using the calculated rotor position.

In some examples, the disclosure is directed to a method for controlling a BLDC motor, the method comprising: estimating, by a controller circuit, a rotor position of the BLDC motor; applying, by the controller circuit, a constant start-up voltage to a stator winding of the BLDC motor using the estimated rotor position until a current at the stator winding corresponds to a local minimum current; in response to the current at the stator winding corresponding to the local minimum current, allowing, by the controller circuit, commutation of the current at the stator winding; calculating, by the controller circuit, the rotor position in response to allowing the commutation of the current at the stator winding; and commutating, by the controller circuit, the current at the stator winding using the calculated rotor position.

In some examples, the disclosure is directed to a system comprising: a single-phase BLDC motor; a current sensor configured to generate a measurement of a current at a stator winding of the BLDC motor; a supply comprising a supply node and a reference node; a first switching module configured to selectively couple a first node of the stator winding to the supply node or the reference node; a second switching module configured to selectively couple a second node of the stator winding to the supply node or the reference node; a driver configured to operate in a first state and a second state, wherein during the first state the driver is configured to drive the first switching module to couple the first node of the stator winding to the supply node and to drive the second switching module to couple the second node of the stator winding to the reference node and wherein during the second state the driver is configured to drive the first switching module to couple the first node of the stator winding to the reference node and to drive the second switching module to couple the second node of the stator winding to the supply node; and a controller circuit configured to: estimate, with the driver, a rotor position of the BLDC motor; apply, with the driver, a constant start-up voltage to the stator winding using the estimated rotor position until the measurement of the current at the stator winding corresponds to a local minimum current; in response to the measurement of the current at the stator winding corresponding to the local minimum current, allow commutation of the current at the stator winding; calculate the rotor position in response to allowing the commutation of the current at the stator winding; and commutate, with the driver, the current at the stator winding using the calculated rotor position.

The details of one or more examples are set forth in the accompanying drawings and the description below. Other features, objects, and advantages of the disclosure will be apparent from the description and drawings, and from the claims.

DETAILED DESCRIPTION

Figure 1:
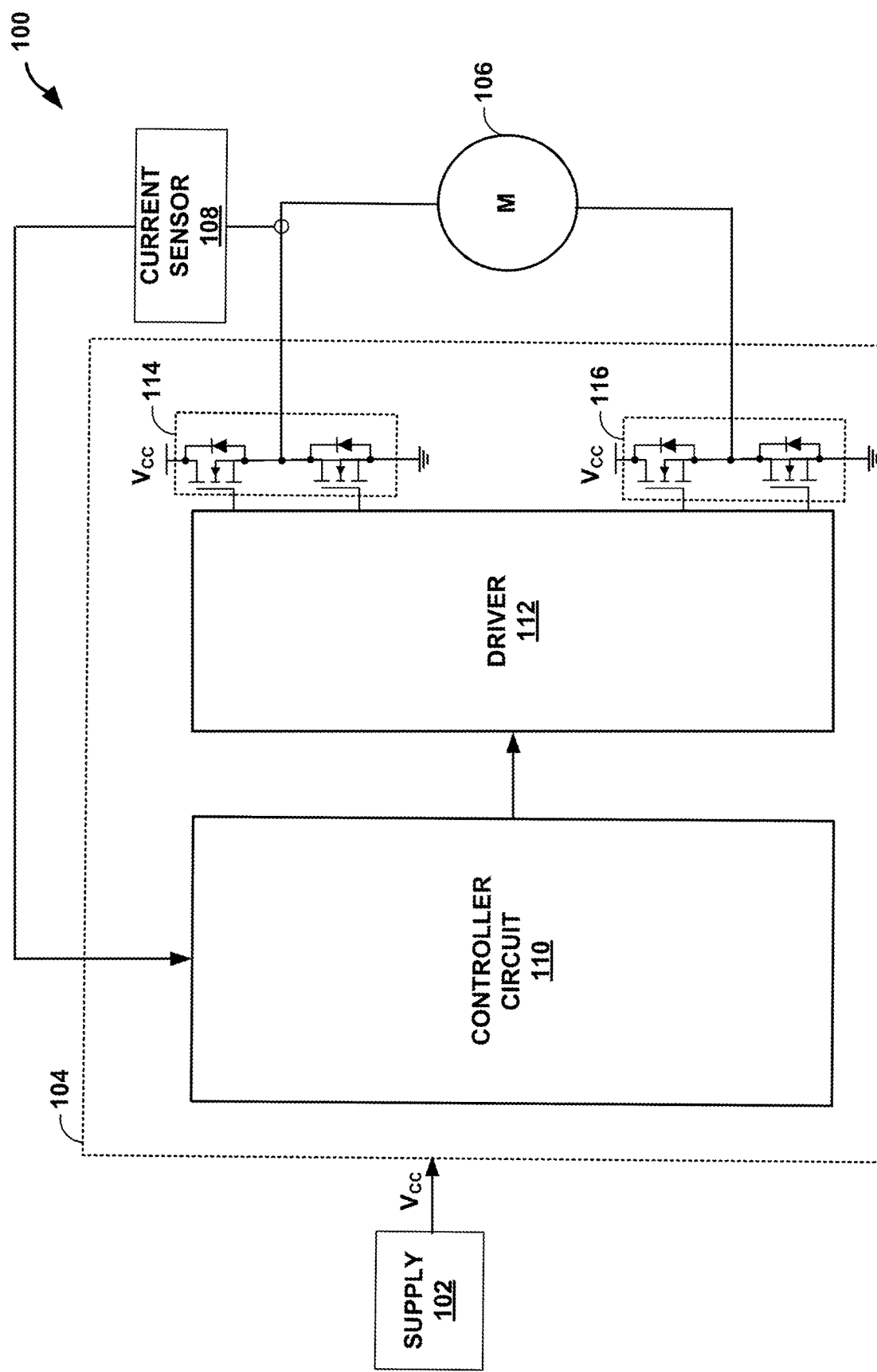
FIG. 1 is a block diagram illustrating an example system configured for sensorless motor control, in accordance with one or more techniques of this disclosure.

FIG. 1 is a block diagram illustrating an example system 100 configured for sensorless motor control, in accordance with one or more techniques of this disclosure. As mentioned above, sensorless motor control may refer to motor control that does not rely on information from any rotation sensor, such as, for example, Hall Effect sensors. In accordance with this disclosure, the controller may use position estimations of a motor, rather than position measurements from Hall Effect sensors.

FIG. 1 shows system 100 as having separate and distinct components, shown as supply 102, integrated circuit (IC) 104, brushless direct current (BLDC) motor 106, and current sensor 108. While IC 104 is illustrated as comprising controller circuit 110, driver 112, first switching module 114, and second switching module 116, IC 104 may include additional or fewer components. For example, supply 102 and/or current sensor 108 may be included in IC 104. In some examples, controller circuit 110 may be a separate and distinct from one or more of driver 112, first switching module 114, and second switching module 116.

Supply 102 may be configured to provide electrical power to BLDC motor 106. For example, supply 102 may include one or more of power grids, generators, transformers, external batteries, external solar panels, windmills, hydro-electrical or wind-powered generators, or any other form of devices that are capable of providing electrical power to system 100. As shown, supply 102 may include a voltage node (Vcc) and reference node (e.g., earth ground or a local ground) for supplying a voltage to components of system 100, for instance, BLDC motor 106.

BLDC motor 106 may include a permanent magnet synchronous motor (PMSM). For example, a PMSM may include a shaft, rotor, stator, and permanent magnet. A permanent magnet may be mounted on or in the rotor. In some examples, the permanent magnet may be surface mounted to the rotor, inset in the rotor, or buried within the rotor. In some examples, the permanent magnet may be an interior magnet. The permanent magnet may include rare-earth elements, such as Neodymium-Iron-Boron (NdFeB), Samarium-Cobalt (SmCo), or Ferrite elements (e.g., Barium (Ba) or Strontium (Sr)). In some examples, the permanent magnet may include a protective coating such as a layer of Gold (Au), Nickel (Ni), Zinc (Zn), or the like. In some examples, BLDC motor 106 may be single phase. For example, the rotor may rotate relative to the stator in response to an electrical current at the stator winding.

First switching module 114 may be configured to selectively couple a first node of a stator winding of BLDC motor 106 to a supply node of supply 102 or a reference node of supply 102. First switching module 114 may include one or more switching elements. For example, first switching module 114 may include a first switching element (e.g., high side switching element) to couple the first node of the stator winding of BLDC motor 106 to a supply node of supply 102 and a second switching element (e.g., low side switching element) to couple the first node of the stator winding of BLDC motor 106 to a reference node of supply 102. Examples of switching elements may include, but are not limited to, silicon-controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. In many examples, switching elements include a high side switch and/or low side switch. Additionally, switching elements may be voltage-controlled and/or current-controlled. Examples of current-controlled switching elements may include, but are not limited to, gallium nitride (GaN) MOSFETs, BJTs, or other current-controlled elements.

Second switching module 116 may be configured to selectively couple a second node of the stator winding of BLDC motor 106 to the supply node of supply 102 or the reference node of supply 102. Second switching module 116 may include one or more switching elements. For example, second switching module 116 may include a first switching element (e.g., high side switching element) to couple the second node of the stator winding of BLDC motor 106 to a supply node of supply 102 and a second switching element (e.g., low side switching element) to couple the second node of the stator winding of BLDC motor 106 to a reference node of supply 102.

Driver 112 may be configured to generate outputs for driving first switching module 114 and/or second switching module 116 based on a control signal output by controller circuit 110. For example, driver 112 may be include one or more switching elements configured to amplify the control signal from controller circuit 110 to drive first switching module 114 and/or second switching module 116. More specifically, for example, driver 112 may be configured to operate in a first state and a second state based on a control signal output by controller circuit 110. For example, during the first state driver 112 may be configured to drive first switching module 114 to couple the first node of the stator winding of BLDC motor 106 to the supply node of supply 102 and to drive second switching module 116 to couple the second node of the stator winding of BLDC motor 106 to the reference node of supply 102. In some examples, during the second state driver 112 is configured to drive first switching module 114 to couple the first node of the stator winding of BLDC motor 106 to the reference node of supply 102 and to drive second switching module 116 to couple the second node of the stator winding of BLDC motor 106 to the supply node of supply 102.

Current sensor 108 may be configured to generate a measurement of current at the stator winding of BLDC motor 106. Current sensor 108 may include a resistor coupled in series with the stator winding of BLDC motor 106 that outputs a voltage indicative of the measurement of the current at the stator winding. In some examples, current sensor 108 may include one or more of a hall effect sensor (e.g., for current measurement only), transform clamp meter, or another current sensor. While current sensor 108 is illustrated as detecting a current between first switching module 114 and BLDC motor (e.g., high side), in some examples, current sensor 108 may detect a current between second switching module 116 and BLDC motor (e.g., low side).

Controller circuit 110 may be configured to control a rotation at BLDC motor 106. For example, controller circuit 110 may apply current at a first polarity to the stator winding of BLDC motor 106 when the a rotor position of BLDC motor 106 is between 0 degrees and 180 degrees (e.g., 0-π) and apply current at a second polarity opposite to the first polarity to the stator winding of BLDC motor 106 when the rotor position of BLDC motor 106 is between 180 degrees and 360 degrees (e.g., π-2π). In some examples, controller circuit 110 may shift the commutation angle (e.g., commutation at 180-x degrees and 360-x degrees). In this way, controller circuit 110 may drive BLDC motor 106 in a single direction (e.g., forward) as the rotor position changes relative to the stator. Controller circuit 110 may be a microcontroller on a single integrated circuit containing a processor core, memory, inputs, and outputs. For example, controller circuit 110 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller circuit 110 may be a combination of one or more analog components and one or more digital components.

For example, controller circuit 110, with current sensor 108, estimates a rotor position of BLDC motor 106. Controller circuit 110, with driver 112, applies a constant start-up voltage to a stator winding of BLDC motor 106 using the estimated rotor position until a current at the stator winding corresponds to a local minimum current. In response to the current at the stator winding corresponding to the local minimum current, controller circuit 110 allows commutation of the current at the stator winding. Controller circuit 110 calculates the rotor position in response to allowing the commutation of the current at the stator winding and commutates, with driver 112, the current at the stator winding using the calculated rotor position.

Figure 2:
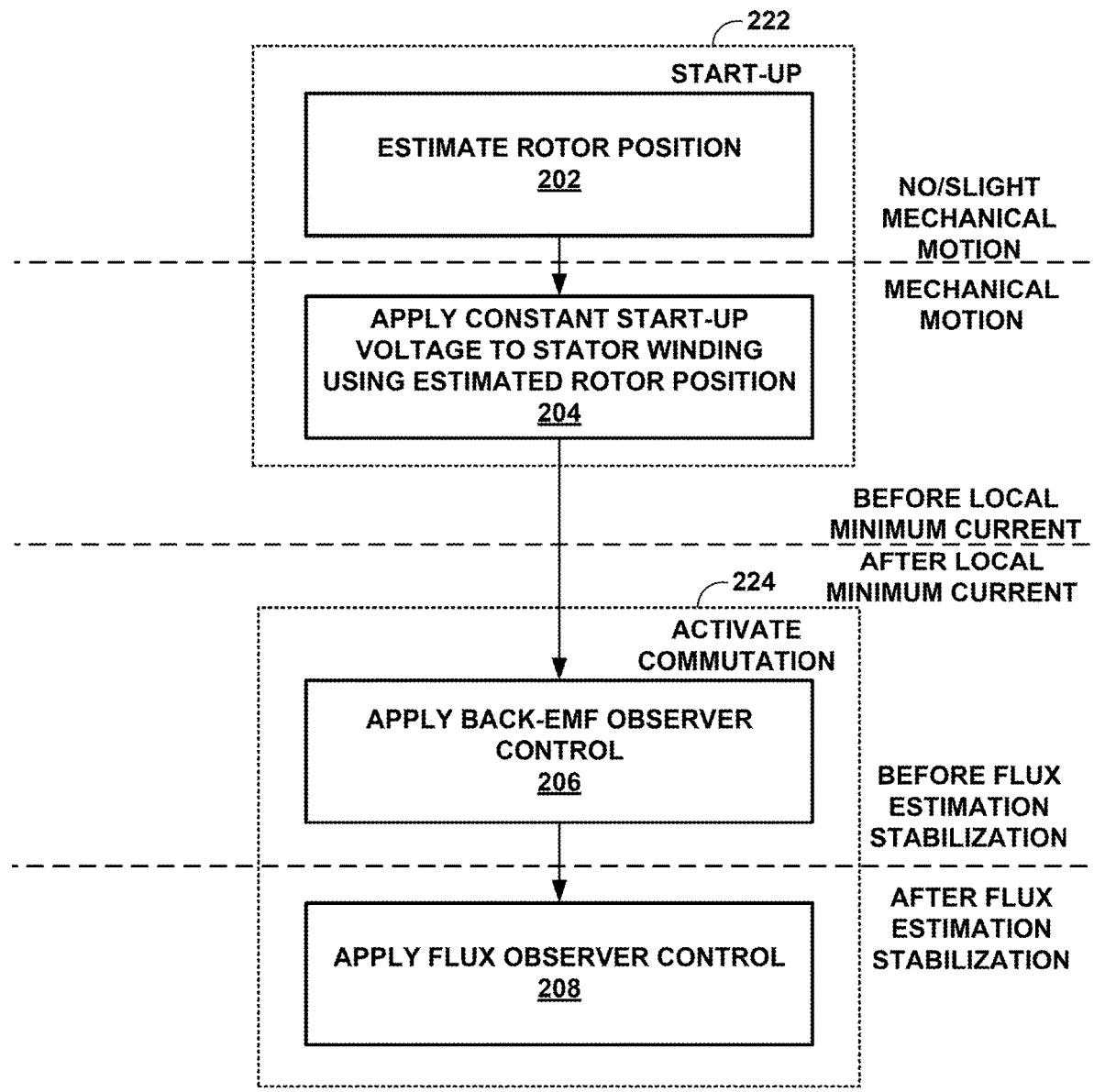
FIG. 2 is a block diagram illustrating continuous motor control through various operating ranges, in accordance with one or more techniques of this disclosure.

FIG. 2 is a block diagram illustrating continuous motor control through various operating ranges, in accordance with one or more techniques of this disclosure. Three different techniques may be employed in this disclosure to allow for a continuous motor control through all possible operating ranges. In the example of FIG. 2, controller circuit 110 may apply start-up control 222, back-emf observer control 206, and flux observer control 208 to allow for a continuous motor control through all possible operating ranges. As shown, back-emf observer control 206 and flux observer control 208 may be collectively referred to herein as "active commutation 224" or simply "commutation 224" which may be selectively allowed by controller circuit 110.

However, start-up control 222, back-emf observer control 206, and flux observer control 208 may not offer redundancy and each technique has a disadvantage for a specific mode of operation. At the very beginning, the rotor is at standstill (e.g., no/slight mechanical motion), thus there is no current in the winding to be analyzed to deduce a back-emf voltage or magnetic flux. As such, back-emf observer control 206 and flux observer control 208 may be non-functional and start-up control 222 may be applied.

More specifically, for example, controller circuit 110 may estimate a rotor position 202. For example, controller circuit 110 may apply an inductance variation techniques to detect the initial rotor position as described in further detail with respect to FIGS. 3 and 4. Afterwards the initial current and respective torque is applied and the rotor set into motion (e.g., mechanical motion). For example, controller circuit 110 may apply a constant start-up voltage to a stator winding of BLDC motor 106 using the estimated rotor position 204.

After mechanical motion, controller circuit 110 may measure current at the stator of BLDC motor 106 and calculate back-emf voltage and magnetic flux. However, shortly after the rotor has begun accelerating the rotor speed is small. As the back-emf is speed dependent, back-emf voltage amplitude may also be too small to be accurately estimated and evaluated. Close to the end of the first commutation period, the back-emf may show a significant deviance from zero suitable for detecting a zero crossing event.

To prevent misinterpretation of the back-emf voltage when back-emf voltage amplitude is too small and subsequent miscalculations cause jitter across zero, back-emf observer control 206 may be activated close to the first actual zero crossing event. As described further with respect to FIG. 5, controller circuit 110 may use a local minimum current to determine when to allow commutation 224. In the example of FIG. 2, controller circuit 110 may use start-up control 222 before a local minimum current to control BLDC motor 106 and commutate 224 current at the stator winding of BLDC motor 106 after the local minimum current. More specifically, for example, controller circuit 110 may use back-emf observer control 206 after the local minimum current and before flux estimation stabilization to drive BLDC motor 106. In this example, controller circuit 110 may use flux observer control 208 after the local minimum current and after flux estimation stabilization to drive BLDC motor 106.

Figure 3:
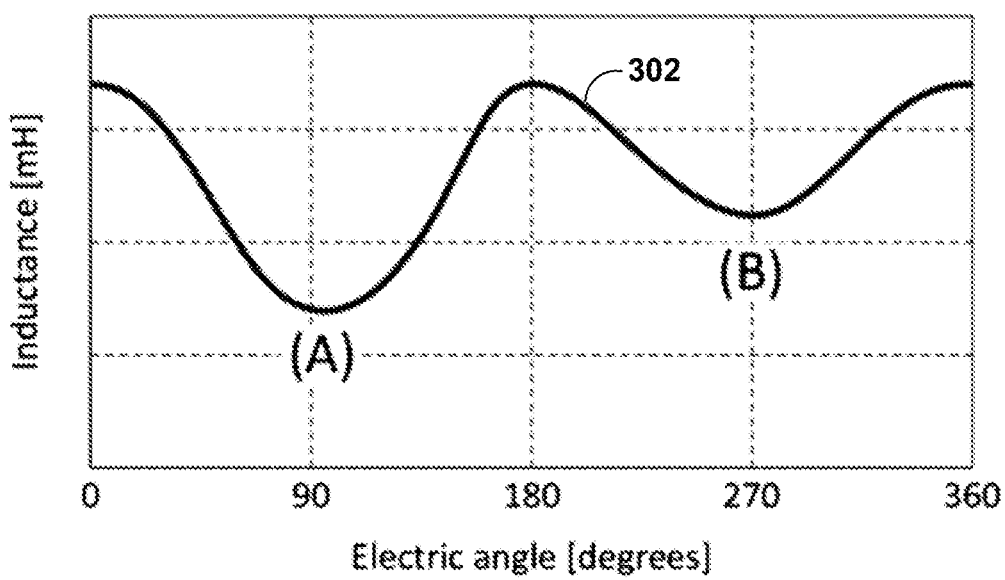
FIG. 3 is an illustration of stator winding inductance and electric angle, in accordance with one or more techniques of this disclosure.

FIG. 3 is an illustration of stator winding inductance and electric angle, in accordance with one or more techniques of this disclosure. The abscissa axis of FIG. 3 is electric angle in degrees and the ordinate axis of FIG. 3 is inductance 302 in millihenry (mH). Depending on rotor position, high currents may cause the stator inductance to become saturated.

When the magnetic field of the rotor aligns and coincides with the stator field, the magnetic flux is increased and leads to a saturation of the stator field. If the rotor position counteracts the developing magnetic field from the stator, the inductance is not saturated. Thus, a deviance between the inductances is measurable at the same rotor angle, if the current flow is reversed. As such, controller circuit 110 may apply two voltage pulses to BLDC motor 106 to inject short current spikes into the stator winding of BLDC motor 106. Depending on the rotor alignment of BLDC motor 106, the absolute amplitude of one current spike is higher than the other. From this, the inductance variation and distribution can be determined.

Figure 4:
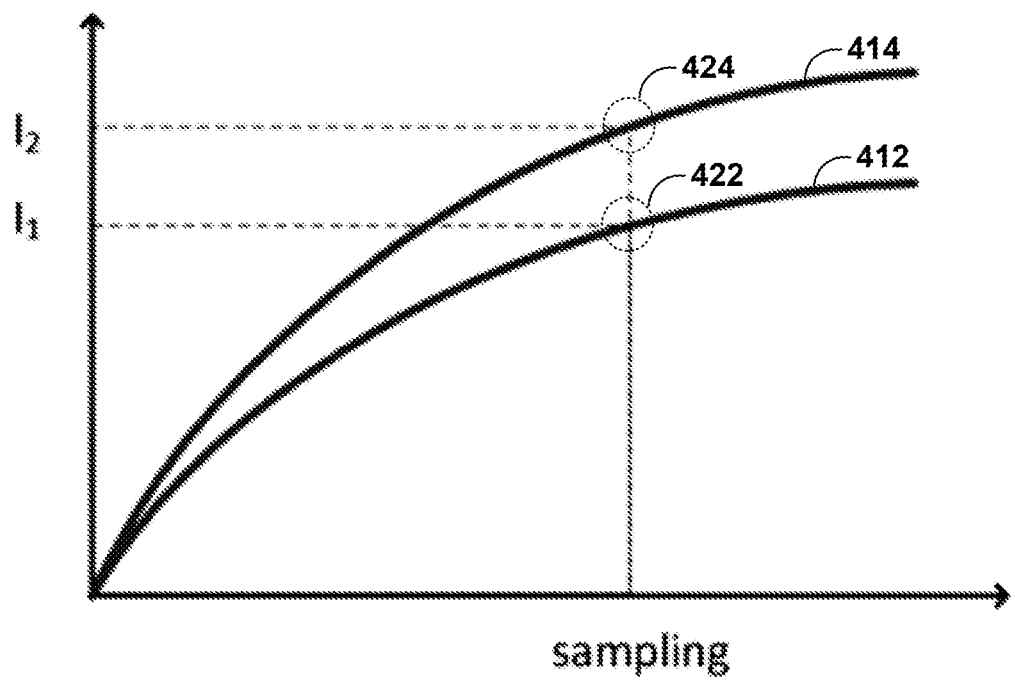
FIG. 4 is an illustration of current at a stator winding in response to voltage pulses, in accordance with one or more techniques of this disclosure.

FIG. 4 is an illustration of current at a stator winding in response to voltage pulses, in accordance with one or more techniques of this disclosure. The abscissa axis of FIG. 4 is a sample of a voltage pulse applied to a stator winding of BLDC motor 106 and the ordinate axis of FIG. 4 is a first current 412 and a second current 414.

Applying voltage pulses to BLDC motor 106 that are equal in their magnitude and duration equal but vary in sign, results in different inductances and furthermore, different current slopes as sketched in FIG. 4 (e.g., first current 412 and second current 414). After the set duration of the voltage pulse, the difference in slope inevitably causes distinctive current values. The inductance in each direction is deduced by comparing their absolute values.

The voltage pulse that generates the second current 414 (i2), which is higher at the end of the pulse duration, correlates with lower inductance. The magnetic field of the rotor enhances the stator flux in this current direction. Subsequently, the stator and rotor field have the same orientation and are aligned. Utilizing this technique allows locating the direction of the rotor angle either in the range of $3/2\pi \to 1/2\pi$ or $1/2\pi \to 3/2\pi$. In the case the magnetic fields are aligned after a positive voltage pulse, $\theta_{el}$ is anywhere between $1/2\pi$ and $3/2\pi$, with $\pi$ being the aligned position.

Said differently, for example, controller circuit 110 may be configured to estimate the rotor position using the current at the stator winding. More specifically, for example, controller circuit 110 may be configured to measure a first current sample 422 at the stator winding in response to applying a first voltage pulse at the stator winding and measure a second current sample 424 at the stator winding in response to applying a second voltage pulse at the stator winding. In some examples, the first voltage pulse and the second voltage pulse may have a same duration. In some examples, the second voltage pulse has an opposite polarity from the first voltage pulse. While the above example refers to a first voltage pulse, in some examples, the first voltage pulse may be a single voltage pulse in a plurality of first voltage pulses used to measure one or more first current samples. Similarly, in some examples, the second voltage pulse may be a single voltage pulse in a plurality of second voltage pulses used to measure one or more second current samples.

Controller circuit 110 may estimate the rotor angle based on first current sample 422 and second current sample 424. For instance, controller circuit 110 may determine the rotor angle is between 0 and 180 electrical degrees (e.g., $0 \to \pi$) when the first current sample 422 is greater than the second current sample 424 and determine the rotor angle is between 180 and 360 electrical degrees (e.g., $\pi \to 2\pi$) when the first current sample 422 is not greater than the second current sample 424.

Controller circuit 110 may use first current sample 422 and second current sample 424 to determine a polarity for the constant start-up voltage. For example, controller circuit 110 may be configured to apply a constant start-up voltage with the first polarity when first current sample 422 is greater than second current sample 424 and to apply the constant start-up voltage with a second polarity when first current sample 422 is not greater than second current sample 424. In this example, the first polarity is opposite to the second polarity.

Controller circuit 110 may use a current threshold to determine a polarity for the constant start-up voltage. For example, controller circuit 110 may be configured to apply the constant start-up voltage with the first polarity when first current sample 422 and/or second current sample 424 is greater a current threshold and apply the constant start-up voltage with the second polarity when first current sample 422 and/or second current sample 424 is not greater a current threshold.

Figure 5:
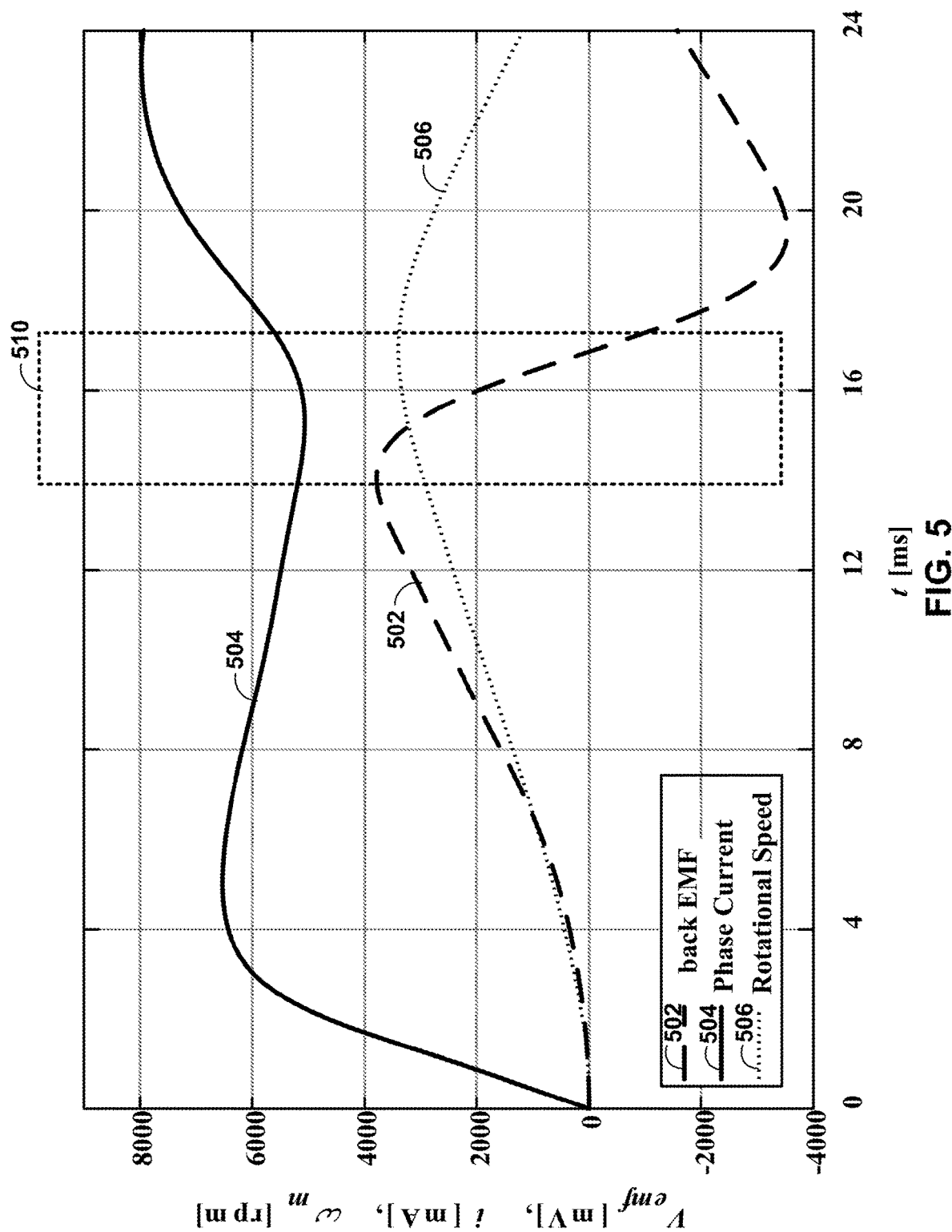
FIG. 5 is an illustration of back-emf voltage and phase current during a first rotation, in accordance with one or more techniques of this disclosure.

FIG. 5 is an illustration of back-emf voltage and phase current during a first rotation, in accordance with one or more techniques of this disclosure. The abscissa axis of FIG. 5 is time in milliseconds and the ordinate axis of FIG. 5 is back-emf voltage 502 at a stator winding of BLDC motor 106, current 504 (e.g., phase current) at a stator winding of BLDC motor 106, and rotation speed 506 of the rotor of BLDC motor 106.

During the first commutation period, controller circuit 110, with driver 112, may apply a constant voltage to BLDC motor 106. Thus, the rotor of BLDC motor 106 accelerates and picks up speed as shown by rotation speed 506. Back-emf voltage 502 crosses zero at the aligned position and has values different from zero during rotation. Subsequently, back-emf voltage 502 reaches a maximum between starting and reaching the aligned position. Current 504 follows a shape that is determined in part by back-emf voltage 502, stator inductance, and stator resistance. Analyzing said shape leads to the observation of current 504 having a local minimum shortly after the peak of back-emf voltage 502 and right before back-emf voltage 502 reaches zero. This characteristic behavior during start-up and first commutation period is simulated and depicted in FIG. 5. Detecting the current minimum is a practical timing technique to enable back-emf voltage 502 observation for the commutation control without relying on a direct measurement of back-emf voltage 502. At the time of a local minimum of current 504, current 504 is close to a peak of back-emf voltage 502 or is high enough for controller circuit 110 to use to calculate an electrical angle of BLDC motor 106.

The subsequent current minimum of current 504 is shown to be in between the peak and zero crossing point of back-emf voltage 502. In the following analysis, the stator inductance, induced voltage, and dynamic behavior of the motor (e.g., BLDC motor 106) are idealized. The inductance of the stator winding of the motor is constant. The shape of back-emf voltage is considered to be trapezoidal at constant speed with infinitely steep flanks, e.g., a rectangle. Additionally, the rotor acceleration is assumed to be constant. During the first commutation period, the shape of the induced voltage is therefore given as a sawtooth voltage defined as follows.

$$V_{emf}(t) = \frac{V_{emf,max}}{\Delta t} \cdot t, \quad \text{EQUATION 1}$$

where $V_{emf,\,max}$ is the amplitude of a peak of back-emf voltage 502 is, $\Delta t$ is the time required to reach the peak and t is the passing time. Basically, $V_{bemf,\,max}/\Delta t$ is a measure for the acceleration of the motor. The shape of the current in a resistor-inductor (RL)-circuit when applying a voltage is given as follows.

$$I(t) = I_0(t) \cdot (1 - e^{-\frac{t}{\tau}}), \quad \text{EQUATION 2}$$

where $I_0$ is the maximum of current 504 and $\tau$ is the time constant of the RL-circuit, which is $\tau = L/R$. In this example, the maximum current $I_0$ is time variant. The maximum current $I_0$ is defined by the maximum DC-Link voltage, the back-emf voltage and winding resistance as follows.

$$I_0(t) = \frac{V - V_{emf}(t)}{R_S}. \quad \text{EQUATION 3}$$

Inserting $I_0(t)$ in Equation 2 results in the following.

$$I(t) = \frac{V - V_{emf}(t)}{R_S} \cdot (1 - e^{-\frac{t}{\tau}}). \quad \text{EQUATION 4}$$

In order to find the position of the current maximum of current 504 during the first commutation period and the initial increase of back-emf voltage 502, the derivative of Equation 4 is formed and evaluated, where the substitution $V_{emf,\,max}/\Delta t = k_\alpha$ is employed as follows.

$$\frac{\partial I(t)}{\partial t} = 0 = \frac{\partial}{\partial t} I_0(t) \cdot (1 - e^{-\frac{t}{\tau}}) + I_0(t) \cdot \frac{\partial}{\partial t}(1 - e^{-\frac{t}{\tau}}) \quad \text{EQUATION 5}$$

$$0 = -\frac{k_\alpha}{R_S} \cdot (1 - e^{-\frac{t}{\tau}}) + \frac{V - k_\alpha}{R_S} \cdot t \cdot \frac{1}{\tau} e^{-\frac{t}{\tau}}$$

$$0 = \left(1 + \frac{V}{\tau \cdot k_\alpha} - \frac{1}{\tau}t\right) \cdot e^{-\frac{t}{\tau}} - 1$$

Numerically solving Equation 5 for t gives the location of the local current maximum of current 504 during the first commutation period. The time t approaches infinity as the coefficient $k_\alpha$ approaches infinity for a very small acceleration.

$$\lim_{k_\alpha \to \infty} t = \infty. \quad \text{EQUATION 6}$$

Due to increasing induced voltage, current 504 decreases after a local current maximum as is also constituted in the state equation of the single phase BLDC motor, which after rearranging is as follows.

$$V - V_{emf} = R_S i + L\frac{di}{dt}. \quad \text{EQUATION 7}$$

Current 504 continues to fall, at least until the maximum of back-emf voltage 502 has been reached. Following a peak of back-emf voltage 502, a current minimum is expected before the induced voltage reaches zero. To this end, the state equation is further transformed, at a local minimum of current 504 and the voltage across the inductance will be zero. Subsequently, back-emf voltage 502 is as follows.

$$V - R_S i = V_{emf}. \quad \text{EQUATION 8}$$

If the current minimum occurs when $V_{emf}$ passes zero, the voltage across the winding resistance is equal the phase voltage. This would demand the highest possible current 504, which is implausible during rotation and having a non-zero back-emf voltage as well as a decreasing current flow beforehand. Additionally, the minimum current 504 cannot be after zero crossing of the induced voltage. A negative $V_{emf}$ would have a current flow during the minimum that is higher than $V/R_s$, which is the highest current that may occur in the system. This scenario is unreasonable as well. The possible location for the current minimum is therefore between a peak of back-emf voltage 502 and zero crossing. Digital simulations further validates this concept in in all applicable load cases and phase voltages.

Accordingly, rather than directly measuring back-emf voltage 502, controller circuit 110 may estimate window 510 between a peak of back-emf voltage 502 and a zero crossing of back-emf voltage 502 using a local current minimum of current 504. In this way, controller circuit 110 may use start-up control 222 before a local minimum current to control BLDC motor 106 and commutate current 504 at the stator winding of BLDC motor 106 after the local minimum current. Specifically, for example, controller circuit 110 may be configured to determine current 504 at the stator winding of BLDC motor 106 corresponds to a local minimum current when a time derivative of current 504 at the stator winding corresponds to zero.

Controller circuit 110 may enable commutation control as the local minimum of the phase current is observed for the first time. Said differently, for example, controller circuit 110 may commutate current at the stator winding of BLDC motor 106 after the local minimum current. Again, for continuous operation, the flux observer control (e.g., flux observer control 208) may continuously estimate rotor angle, which may be employed to vary the commutation angle. However, the flux observer control may rely on drift compensation to function sufficiently precisely. The filter for compensating for drift may use several rotations to settle and start supporting the flux estimator. During that time, commutation may be controlled through back-EMF observer control (e.g., back-emf observer control 206) and then switched to the flux observer control after drift is accurately compensated.

The aligned rotor position may coincide with the zero crossing of back-emf voltage 502. Even when the aligned rotor position is not directly employed to determine a continuous rotor angle, back-emf voltage 502 is useful to locate the rotor in 180 degree sectors. This is ample information of back-emf voltage 502 to define commutation points. Especially for starting, detecting the aligned positions suffices and provides a robust mean to control the commutation.

Contrary to three phase motors, the induced voltage may not be measurable while simultaneously applying torque. In order to measure back-emf voltage 502 across the stator winding, current 504 may be completely dissipated, otherwise voltage across the ohmic resistance and potentially the inductance may distort the measurement. Interrupting the commutation pattern for some blanking time and measuring the phase voltage is not particularly efficient and hinders the motor to develop its maximum torque and speed. Therefore, back-emf voltage 502 may instead be deduced continuously and without interrupting the normal operation of the machine. Rearranging the state equation of a single phase BLDC motor results in the following.

$$V = R_S \cdot i + L_S \cdot \frac{di}{dt} + V_{emf}, \qquad \text{EQUATION 9}$$

Equation 9 gives back-emf voltage 502 as function of the motor parameters $R_S$, $L_S$, the phase voltage V and measurable current i as follows.

$$V_{emf} = V - R_S \cdot i - L_S \cdot \frac{di}{dt}. \qquad \text{EQUATION 10}$$

From Equation 10 back-emf voltage 502 may be calculated, as all the necessary data and information is available. For example, controller circuit 110 may commutate the current at a stator winding of BLDC motor 106 using a calculated rotor position. Specifically, for example, controller circuit 110 may be configured to estimate back-emf voltage using the current at the stator winding.

Current sensor 108 may be employed to detect the momentary current in the stator winding of BLDC motor 106. The phase voltage may be determined by a pulse-width-modulation (PWM) generator (of controller circuit 110) that projects the voltage output of the current/torque controller. Using the output of the PWM generator deposes of the need for an additional sensor measuring the voltage directly. However, in some examples, controller circuit 110 may receive, from a voltage sensor, a measured voltage at the stator winding of BLDC motor 106. The winding resistance of the stator winding may be a known motor constant. Precisely modelling the inductance may use the rotor angle and current as input. The back-emf observer control may be unable to generate an angle estimation itself. Thus, inductance may be approximated as the average, when no rotor position is available. Consequently, this approximation of inductance impairs the precision of the calculation compared to flux observer control. Nevertheless, the adverse effects are tolerable, as the inductance does not vary greatly when the motor is run within normal operating conditions. The saturation effects caused by the applicable currents are far from the extreme and thus the overall inductance remains in proximity of the average.

Minor calculation or measurement errors, especially with values close to zero, may occasionally lead to the back-emf voltage jittering around zero before assuming greater values. Therefore, in order to prevent the back-emf observer control from detecting this as more than one zero crossing, controller circuit 110 may implement a filter. If a zero crossing has been detected, the filter does not allow values with the previous sign for a predefined number of cycles. When this case occurs, the erroneous value is substituted with the previous.

Controller circuit 110 may assign the rotor angle a range of $0 \to \tau$ or $\tau \to 2\tau$. If the rotor is located in the first range, the back-emf voltage is positive, if the rotor is located in the latter, the back-emf voltage is negative. After this step, the back-emf observer control provides enough information to properly commutate the motor and establish an effective control. For example, controller circuit 110 may calculate the rotor position (e.g., $0 \to \tau$ or $\tau \to 2\tau$) of BLDC motor 106 using the estimated back-emf voltage. In this example, controller circuit 110 may be configured to select a first polarity or a second polarity for the current at the stator winding using the calculated rotor position. In some examples, the first polarity is opposite to the second polarity. For instance, the first polarity may be positive and the second polarity may be negative or the first polarity may be negative and the second polarity may be positive.

Nevertheless, controller circuit 110 may extrapolate the motor angle between the zero crossing events. This extrapolation may be an effective and precise technique to obtain a continuous angle, when the rotor is in a static condition and not accelerating. As long as the rotational speed is subject to limited variance, controller circuit 110 may exploit the duration between the two most recent zero crossing events to update the rotor angle. First, controller circuit 110 calculates the angle increment $\theta_{inc}$ for a calculation time step $T_S$ is calculated as follows.

$$\theta_{inc} = \frac{\pi}{t_{ZCP2} - t_{ZCP1}} \cdot T_S. \qquad \text{EQUATION 11}$$

where $t_{ZCP1}$ is a time for a first zero crossing and $t_{ZCP2}$ is a time for a second zero crossing occurring immediately after the first zero crossing.

Subsequently, controller circuit 110 may add this increment up every time the calculation is executed resulting in a linearly extrapolated approximation of the continuous rotor angle. The zero crossing of the back-emf voltage may reset this estimation to the reliable angle estimation. The extrapolation may deviate from the actual rotor angle in case the motor is accelerating. A time between two zero crossing events may correlate with no constant but the average speed of that period. If the rotation accelerates, the determined speed may not provide information about the one in the following interval. To decide when the extrapolation is valid, controller circuit 110 may compare the time difference between two intervals to a pre-set threshold. Controller circuit 110 may discard the extrapolation if the threshold is exceeded.

In this way, controller circuit 110 may calculate the rotor position using the back-emf observer control. For example, to calculate the rotor position, controller circuit 110 may be configured to determine the calculated rotor position corresponds to an electrical angle of 180 degrees in response to the back-emf voltage crossing zero when the back-emf voltage has the first polarity. In this example, controller circuit 110 may be configured to determine the calculated rotor position corresponds to an electrical angle of 0 degrees in response to the back-emf voltage crossing zero when the back-emf voltage has the second polarity. In this example, to commutate the current at the stator winding, controller circuit 110 may be configured to select the first polarity for the current at the stator winding in response to determining the calculated rotor position corresponds to the electrical angle of 0 degrees and select the second polarity for the current at the stator winding in response to determining the calculated rotor position corresponds to the electrical angle of 180 degrees.

Calculation of rotor position based on a back-emf voltage estimation allows controller circuit 110 to control the commutation by determining the aligned positions of the rotor. Further, at near constant speeds, a continuous angle is deductible and may be used for commutation angle control or the modelling of the stator inductance.

Figure 6:
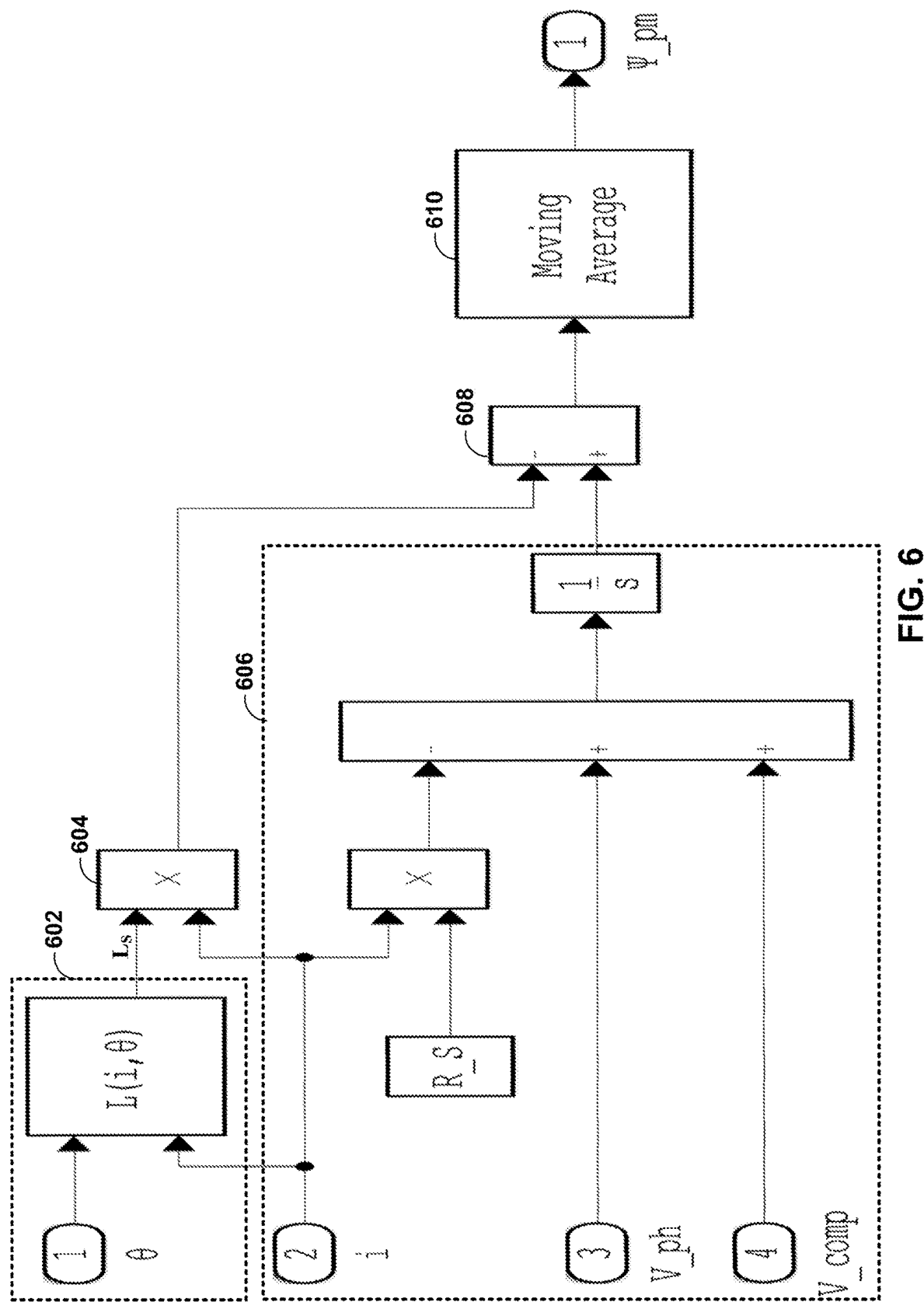
FIG. 6 is a block diagram illustrating an example implementation of flux observer control, in accordance with one or more techniques of this disclosure.

FIG. 6 is a block diagram illustrating an example implementation of flux observer control, in accordance with one or more techniques of this disclosure. For the application in a single phase BLDC motor, a flux observer technique may be used as follows. Calculated magnetic flux, a $2\tau$ periodic function, would be subject to a certain ramp drift and DC offset. Due to this effect extra steps may be used to allow the exploitation of the flux observer for angle estimation. To further analyze the data, the values may be centered on a zero line with the maxima and minima showing equal absolute amplitudes. Therefore, controller circuit 110 may include a compensational controller, whose output $V_{comp}$ is directly added, which results in the following.

$$\psi_{PM} = \int_0^t (V - R_S \cdot i + V_{comp}) dt - L_S \cdot i. \qquad \text{EQUATION 12}$$

This compensational controller may be implemented as demonstrated by FIG. 6. For example, module 602 generates stator inductor ($L_S$). Module 604 multiplies the stator inductor and stator current. Module 606 generates $\int_0^t (V - R_S \cdot i + V_{comp}) dt$. In this example, module 608 subtracts the output of module 604 from the output of module 606. Module 610 generates a moving average ($\psi_{pm}$) using the output of module 606.

Figure 7:
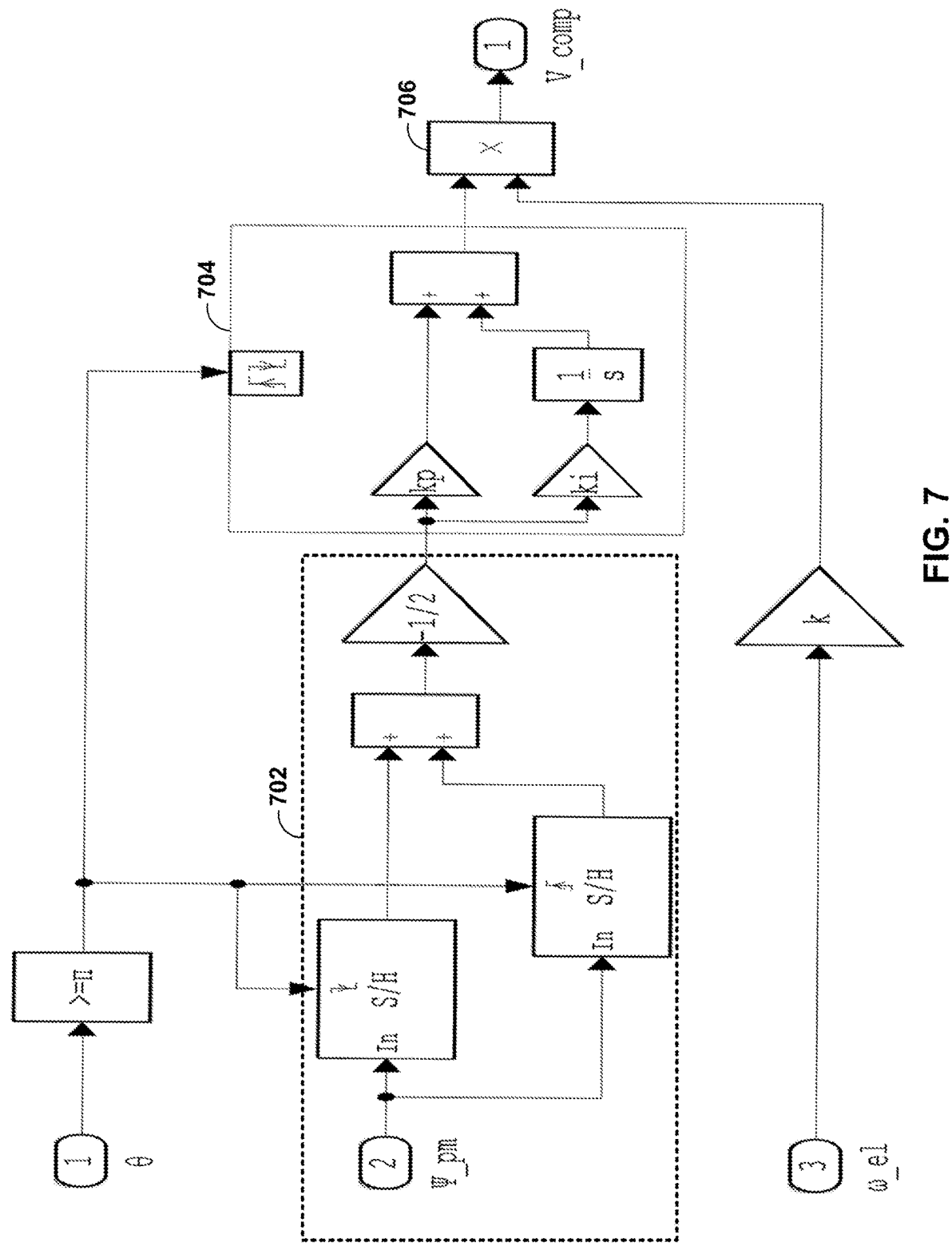
FIG. 7 is a block diagram illustrating an example implementation of flux drift compensation, in accordance with one or more techniques of this disclosure.

FIG. 7 is a block diagram illustrating an example implementation of flux drift compensation, in accordance with one or more techniques of this disclosure. Some systems use drift compensation as a standard proportional-integral (PI) controller with input as the total flux. Such systems would continuously try to control the flux to zero thus equalizing the area beneath the curve. However, such techniques are disadvantageous in dynamic scenarios, for example during acceleration. The controller may not be fast enough to cope with the fast-changing frequencies. Even though such systems may work to a certain extent at constant speeds, such systems are not well suited to estimate the flux to a satisfying precision. Furthermore, such systems may distort the shape of the calculated flux, resulting in calculation errors later on in the determination of the rotor angle.

In order to compensate for the shortcomings of the continuous PI-controller, controller circuit 110 may be configured with compensation that is extended and discretized as demonstrated in FIG. 7.

Compensation of FIG. 7 may be configured to offset the calculated flux with the result that the minima and maxima are symmetrically distributed in relation to the zero line. For example, module 702 may generate the minima (e.g., first flux sample) and maxima (e.g., second flux sample) that are symmetrically distributed in relation to the zero line. Thus, drift compensation of FIG. 7 may employ the sum of two subsequent peak values as input for a triggered PI-controller 704. Divided by two, this is exactly the absolute offset the minimum and maximum respectively have to zero.

Controller circuit 110 may detect the minima and maxima by observing the back-emf voltage. In the aligned position, the magnetic flux from the permanent magnets is greatest. Thus, controller circuit 110 may sample the flux values when detecting a zero crossing event of the back-emf voltage. The compensational controller may be subsequently triggered and executed once per half cycle. Further, module 706 scales the controller output by the rotational speed, as the ramp drift is observably speed dependent.

For example, to calculate the rotor position, controller circuit 110 may be configured to generate a first flux sample in response to the calculated rotor position corresponding to an electrical angle of 0 degrees, generate a second flux sample in response to the calculated rotor position corresponding to an electrical angle of 180 degrees, and generate a compensation voltage using the first flux sample and the second flux sample.

More specifically, for example, to calculate the rotor position, controller circuit 110 may be configured to estimate a back-emf voltage using the current at the stator winding. In this example, controller circuit 110 may determine the calculated rotor position corresponds to the electrical angle of 180 degrees in response to the back-emf voltage crossing zero when the back-emf voltage has a first polarity. In this example, controller circuit 110 may determine the calculated rotor position corresponds to the electrical angle of 0 degrees in response to the back-emf voltage crossing zero when the back-emf voltage has a second polarity, wherein the first polarity is opposite to the second polarity.

In this way, to generate the compensation voltage, controller circuit 110 may be configured to determine an average of the first flux sample and the second flux sample as input to a proportional-integral controller and scale an output of the proportional-integral controller by a rotation speed of the BLDC motor.

A next step after successfully estimating the rotor flux is the erection of the orthogonal system of flux and the flux delayed by 90 degrees generating the imaginary component of the flux phasor. This may be accomplished by recoding the calculated flux data and reemploying it after a variable number of calculation time steps $N_{TS}$. The number of delay periods may depend on the electric frequency and thereby on the rotational speed. The number of delay periods may corresponds with the time required for the rotor to complete an angle of $\pi/2$. The number of sampling periods may be as follows.

$$N_{T_S} = \frac{2\pi}{4 \cdot \omega_{el} \cdot T_S}. \qquad \text{EQUATION 13}$$

With the estimated permanent magnet flux and the delayed flux the rotor angle calculated using the a tan 2 function, the rotor angle is as follows.

$$\theta_{atan2} = a\tan 2(\psi_{PM_d}, \psi_{PM}) + \pi. \qquad \text{EQUATION 14}$$

While the back-emf voltage may, in some examples, be used to determine flux minima and maxima (e.g., first flux sample, second flux sample, etc.), in some examples, controller circuit 110 may determine the flux minima and maxima using the calculated rotor angle. For example, to calculate the rotor position, controller circuit 110 may be configured to continuously estimate a flux for the BLDC motor using the compensation voltage and continuously calculate the rotor position using the flux. In this example, controller circuit 110 may generate the first flux sample in response to the continuously estimated rotor position corresponding to the electrical angle of 0 degrees and may generate the second flux sample in response to the continuously estimated rotor position corresponding to the electrical angle of 180 degrees. In this way, controller circuit 110 may generate the first flux sample in response to the continuously estimated rotor position corresponding to the electrical angle of 0 degrees and may generate the second flux sample in response to the continuously estimated rotor position corresponding to the electrical angle of 180 degrees.

Figure 8:
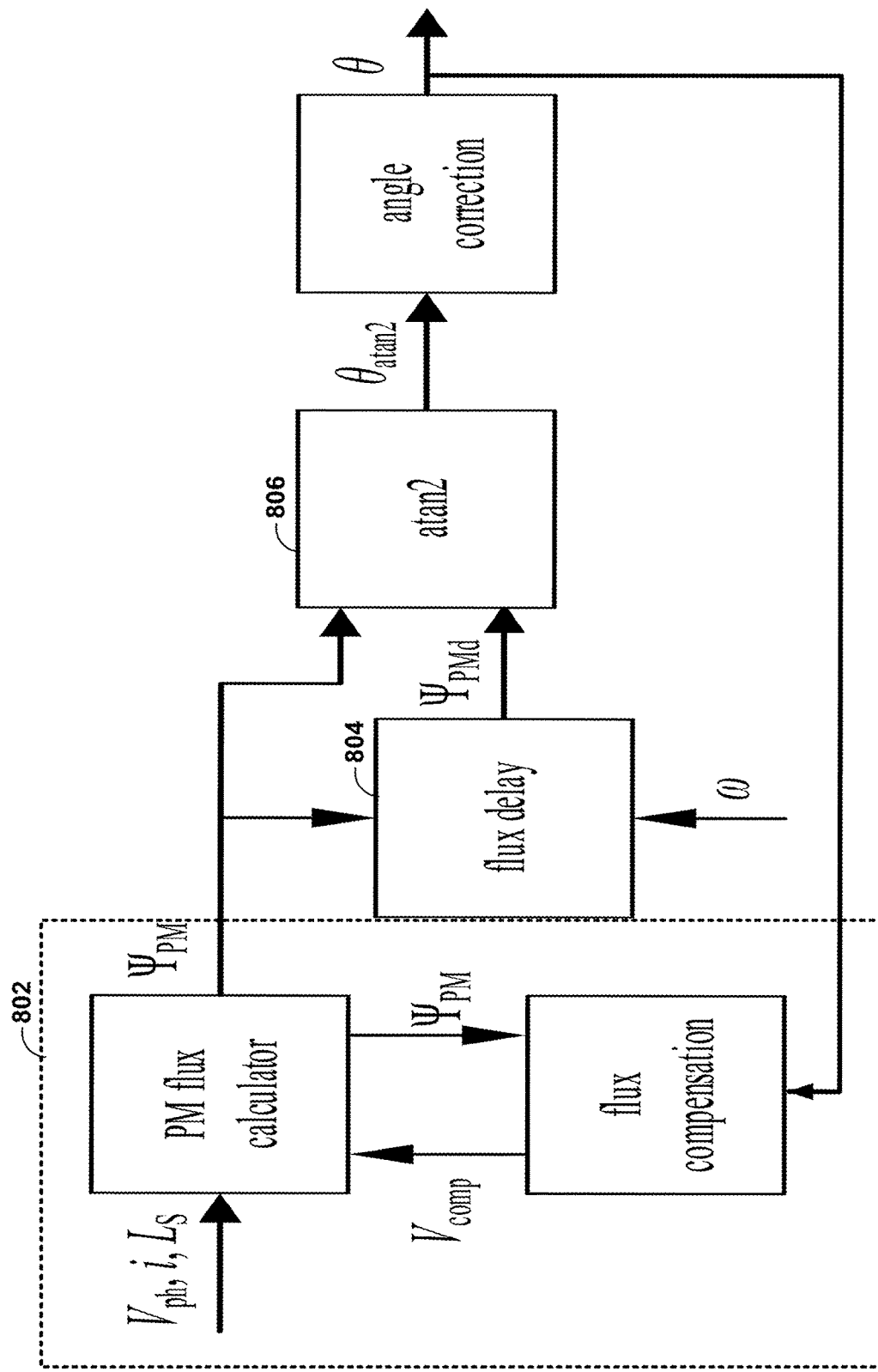
FIG. 8 is a block diagram illustrating an example implementation of angle estimation based on flux, in accordance with one or more techniques of this disclosure.

FIG. 8 is a block diagram illustrating an example implementation of angle estimation based on flux, in accordance with one or more techniques of this disclosure. Overall, the rotor position estimation may comprise the 3 steps as illustrated in FIG. 8, although additional steps may be used in other examples. First step 802 includes the flux calculation and compensation via a triggered subsystem. Second step 804 includes delaying the flux by a speed dependent number of sampling periods. Third step 806 includes computing the rotor angle using the a tan 2 function.

Figure 9:
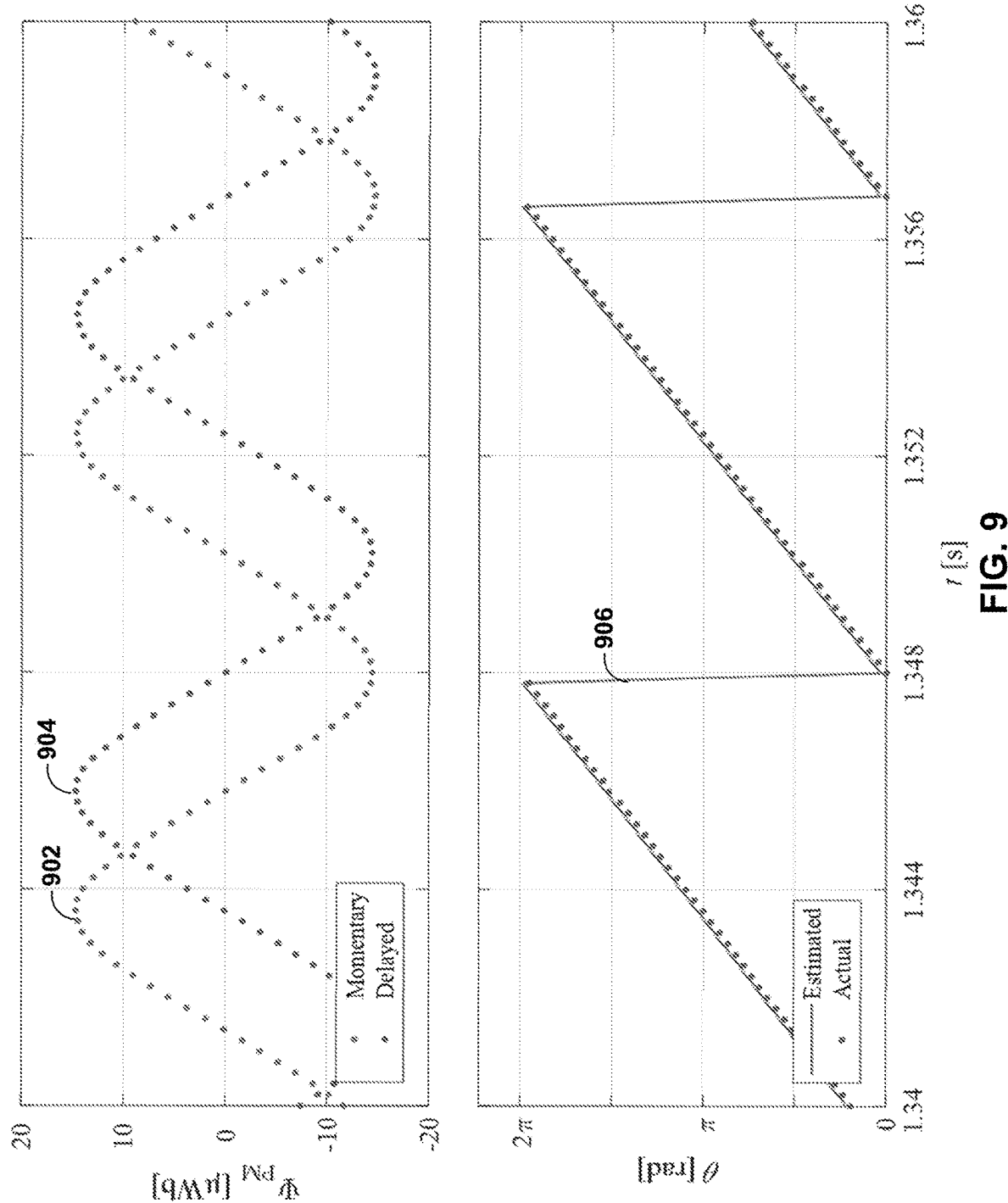
FIG. 9 is an illustration of calculated magnetic flux and flux delayed by $\pi/2$ and extracted rotor angle at a rotational speed of 3500 revolutions per minute (rpm), in accordance with one or more techniques of this disclosure.

FIG. 9 is an illustration of calculated magnetic flux and flux delayed by π/2 and extracted rotor angle at a rotational speed of 3500 revolutions per minute (rpm), in accordance with one or more techniques of this disclosure. The abscissa axis of FIG. 9 is time in seconds and the ordinate axis of FIG. 9 is momentary flux 902 of BLDC motor 106, delayed flux 904 of BLDC motor 106, estimated rotor angle 906, and actual rotor angle, which is substantially overlapping estimated rotor angle 906. As shown in FIG. 9, once stabilized, the angle calculation based on constructed orthogonal flux (e.g., flux observer control) is reliable to use and produces an average error of less than 2%.

Figure 10:
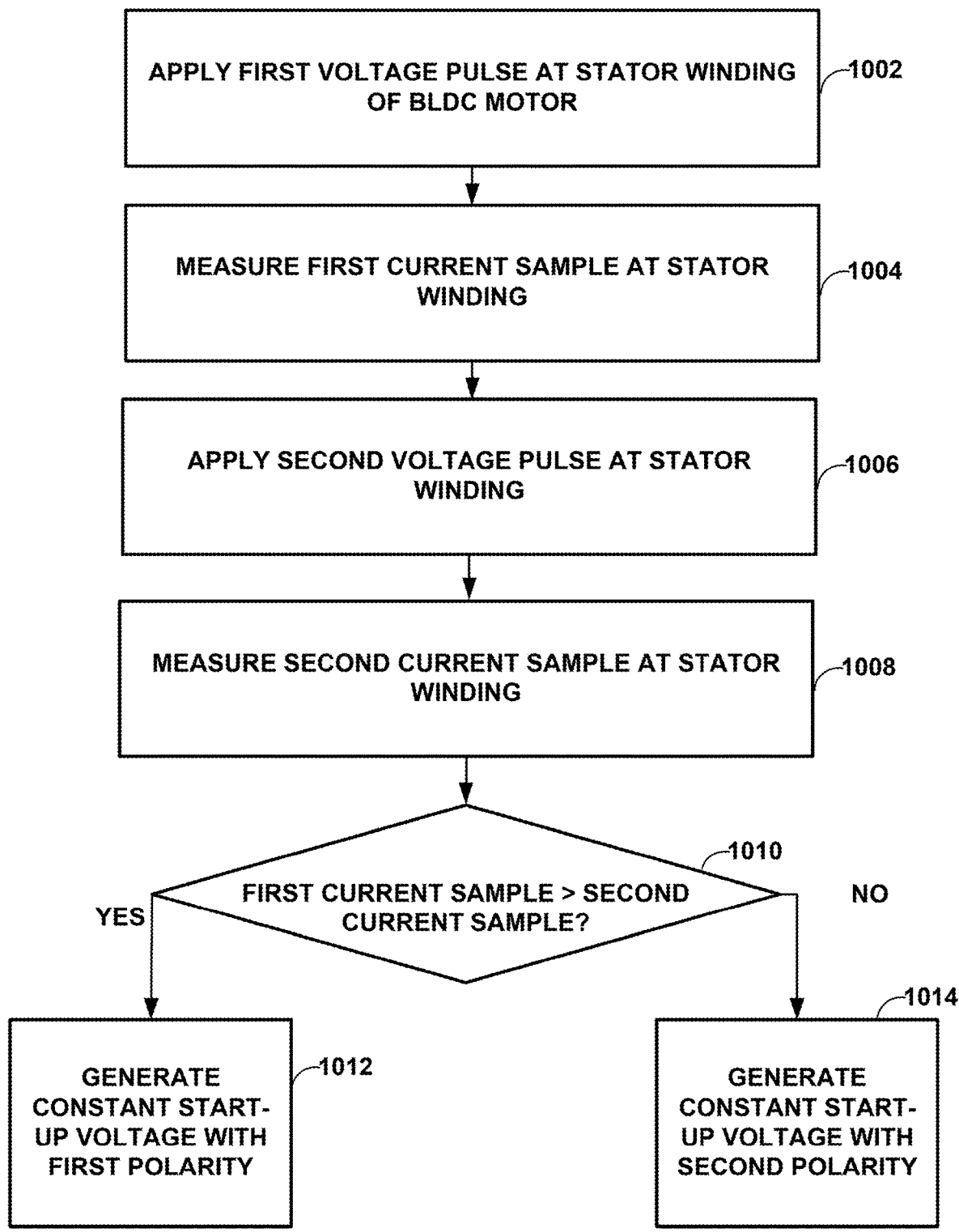
FIG. 10 is a flow diagram for estimating a rotor position and applying a constant start-up voltage to a stator winding of a BLDC motor using the estimated rotor position, in accordance with one or more techniques of this disclosure.

FIG. 10 is a flow diagram for estimating a rotor position and applying a constant start-up voltage to a stator winding of a BLDC motor using the estimated rotor position, in accordance with one or more techniques of this disclosure. For purposes of illustration only, the example operations are described below within the context of FIGS. 1-9.

According to the technique of FIG. 10, controller circuit 110 applies a first voltage pulse at a stator winding of BLDC motor 106 (1002). Controller circuit 110 measures a first current sample at the stator winding (1004). Controller circuit 110 applies a second voltage pulse at the stator winding (1006). Controller circuit 110 measures a second current sample at the stator winding (1008).

Controller circuit 110 determines whether the first current sample is greater than the second current sample (1010). In response to determining the first current sample is greater than the second current sample ("YES" of step 1010), controller circuit 110 generates constant start-up voltage with a first polarity (1012). In response, however, to determining the first current sample is not greater than the second current sample ("NO" of step 1010), controller circuit 110 generates constant start-up voltage with a second polarity (1014). In some examples, the first polarity is opposite from the second polarity.

Figure 11:
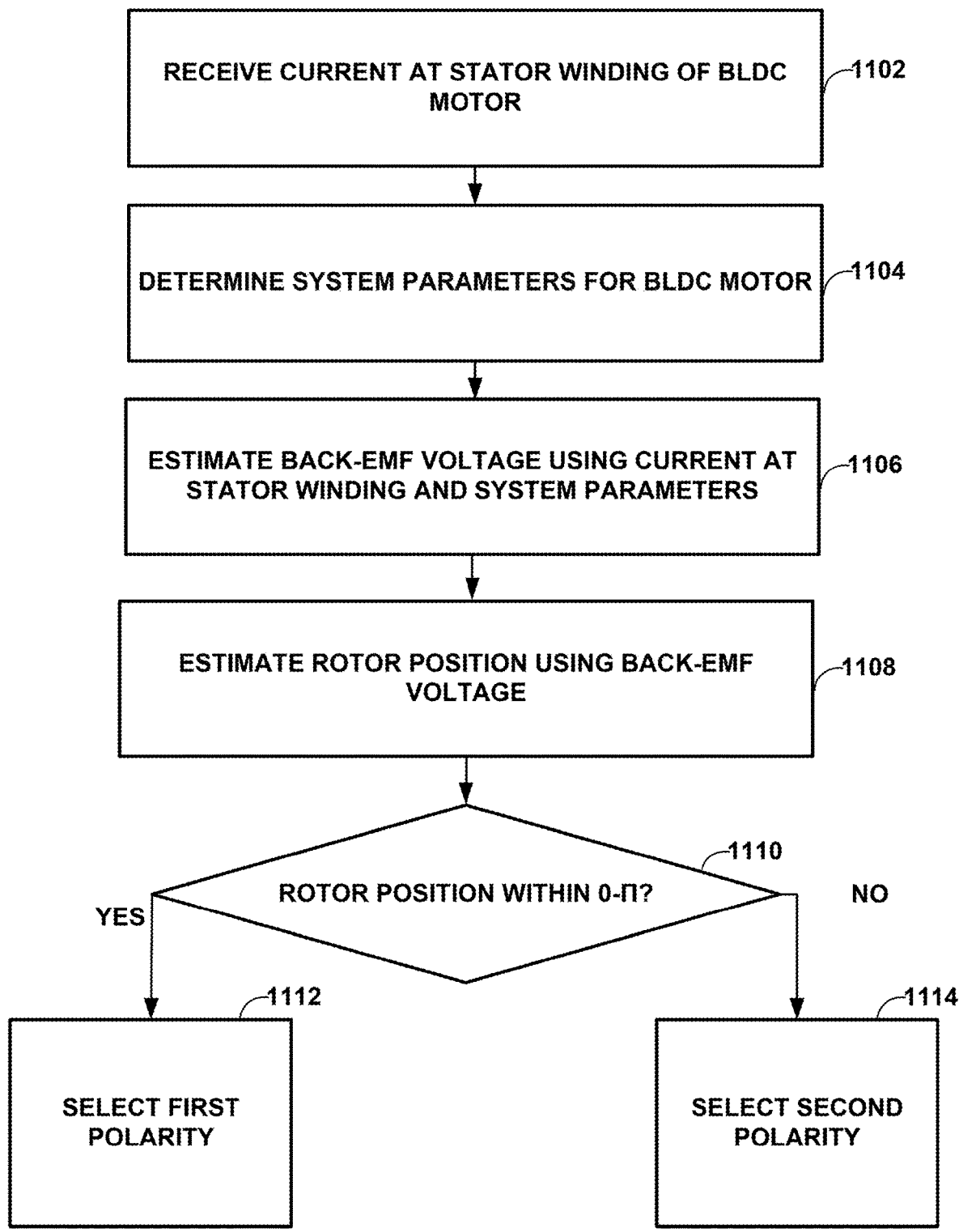
FIG. 11 is a flow diagram for commutating current at a stator winding of a BLDC motor using estimated back-emf, in accordance with one or more techniques of this disclosure.

FIG. 11 is a flow diagram for commutating current at a stator winding of a BLDC motor using estimated back-emf, in accordance with one or more techniques of this disclosure. For purposes of illustration only, the example operations are described below within the context of FIGS. 1-9.

As shown in FIG. 11, controller circuit 110 receives current at a stator winding of BLDC motor 106 (1102). Controller circuit 110 determines system parameters for BLDC motor 106 (1104). For example, controller circuit 110 determines system parameters such as, for example, but not limited to, stator resistance, stator inductance, or other system parameters. Controller circuit 110 estimates back-emf voltage using current at the stator winding and system parameters (1106). For example, controller circuit 110 estimates the back-emf voltage according to equation 10. Controller circuit 110 estimates a rotor position of BLDC motor 106 using the back-emf voltage (1108). For example, controller circuit 110 estimates the rotor position of BLDC motor 106 according to equation 11. Controller circuit 110 determines whether the rotor position is within 0-π (e.g., 0-180 degrees) (1110). In response to determining the rotor position is within 0-π ("YES" of step 1110), controller circuit 110 selects a first polarity (1112). In response to determining the rotor position is not within 0-π ("NO" of step 1110), controller circuit 110 selects a second polarity (1114). In some examples, the first polarity is opposite from the second polarity.

Figure 12:
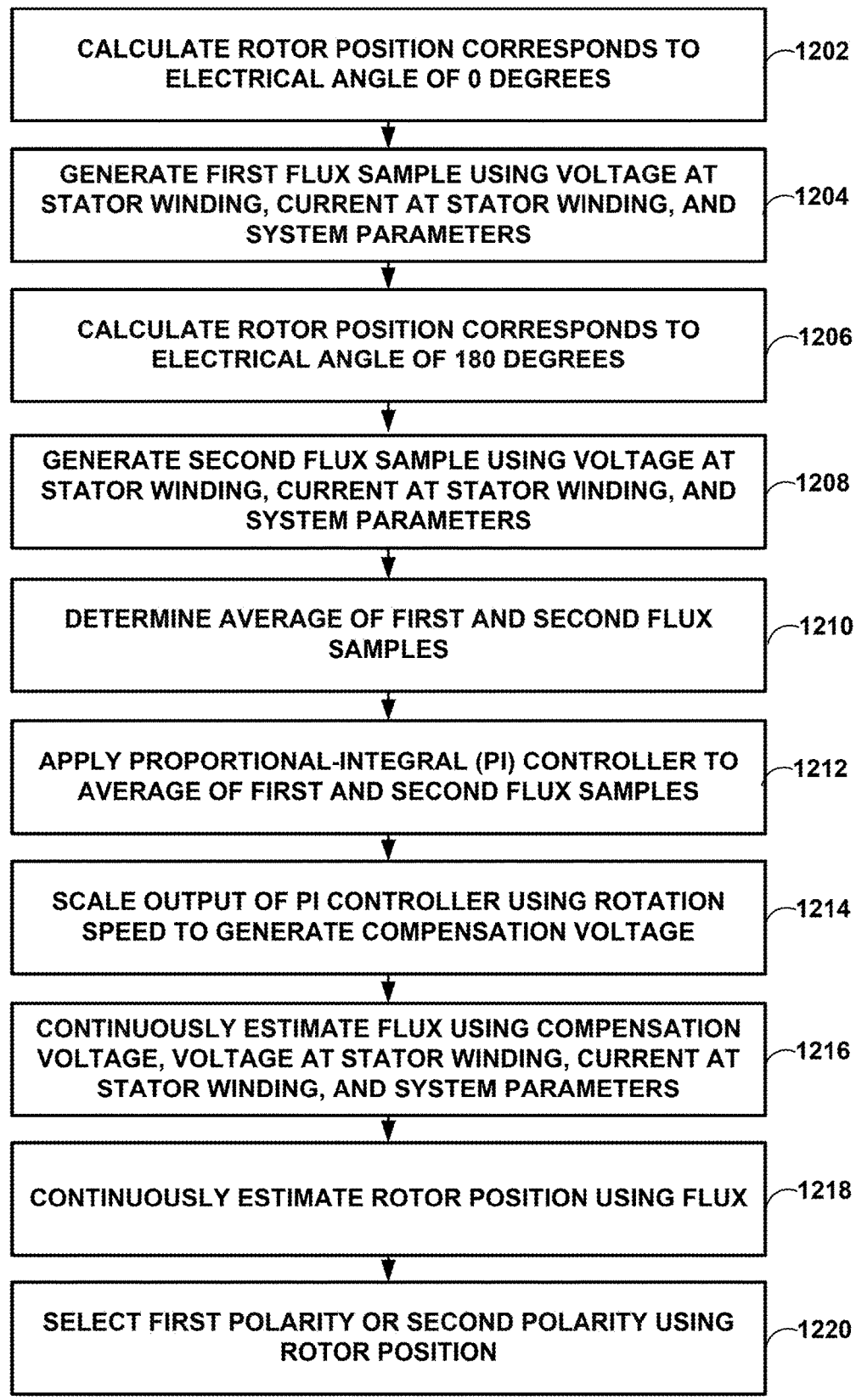
FIG. 12 is a flow diagram for commutating current at a stator winding of a BLDC motor using a drift compensation that is based on minima and maxima flux, in accordance with one or more techniques of this disclosure.

FIG. 12 is a flow diagram for commutating current at a stator winding of a BLDC motor using a drift compensation that is based on minima and maxima flux, in accordance with one or more techniques of this disclosure. For purposes of illustration only, the example operations are described below within the context of FIGS. 1-9.

As shown in FIG. 12, controller circuit 110 calculates a rotor position of BLDC motor 106 corresponds to an electrical angle of 0 degrees (1202). For example, controller circuit 110 calculates the rotor position as corresponding to the electrical angle of 0 degrees in response to a back-emf voltage crossing zero when the back-emf voltage has a second polarity. In some examples, controller circuit 110 calculates the rotor position as corresponding to the electrical angle of 0 degrees in response to a continuously estimated rotor position corresponding to the electrical angle of 0 degrees. In any case, controller circuit 110 generates a first flux sample using a voltage at a stator winding of BLDC motor 106, a current at the stator winding, and system parameters (1204). For example, controller circuit 110 generates a first flux sample according to equation 12 in response to the calculated rotor position corresponding to an electrical angle of 0 degrees.

Controller circuit 110 calculates a rotor position of BLDC motor 106 corresponds to an electrical angle of 180 degrees (1206). For example, controller circuit 110 calculates the rotor position as corresponding to the electrical angle of 180 degrees in response to a back-emf voltage crossing zero when the back-emf voltage has a first polarity. The first polarity may be opposite to the second polarity. In some examples, controller circuit 110 calculates the rotor position as corresponding to the electrical angle of 180 degrees in response to a continuously estimated rotor position corresponding to the electrical angle of 180 degrees. In any case, controller circuit 110 generates a second flux sample using a voltage at the stator winding, a current at the stator winding, and system parameters (1208). For example, controller circuit 110 generates a first flux sample according to equation 12 in response to the calculated rotor position corresponding to an electrical angle of 180 degrees.

Controller circuit 110 determines an average (e.g., mean, median, etc.) of the first flux sample and the second flux sample (1210). Controller circuit 110 applies a PI controller to average of the first and second flux samples (1212). For example, controller circuit 110 may use the average of the first and second flux samples as an input to the PI controller. Controller circuit 110 scales the output of the PI controller using a rotation speed of the rotor of BLDC motor 106 to generate a compensation voltage (1214).

Controller circuit 110 continuously estimates a flux for BLDC motor 106 using the compensation voltage, the voltage at the stator winding, the current at the stator winding, and system parameters (1216). For example, controller circuit 110 continuously estimates a flux for BLDC motor 106 according to equation 12. Controller circuit 110 continuously estimates a rotor position for BLDC motor 106 using the flux (1218). For example, controller circuit 110 continuously estimates the rotor position for BLDC motor 106 according to equation 14. Controller circuit 110 selects a first polarity or a second polarity using the rotor position (1220). For example, controller circuit 110 selects the first polarity in response to determining the rotor position is within 0-$\pi$ and selects the second polarity in response to determining the rotor position is not within 0-$\pi$. In some examples, the first polarity is opposite from the second polarity.

Figure 13:
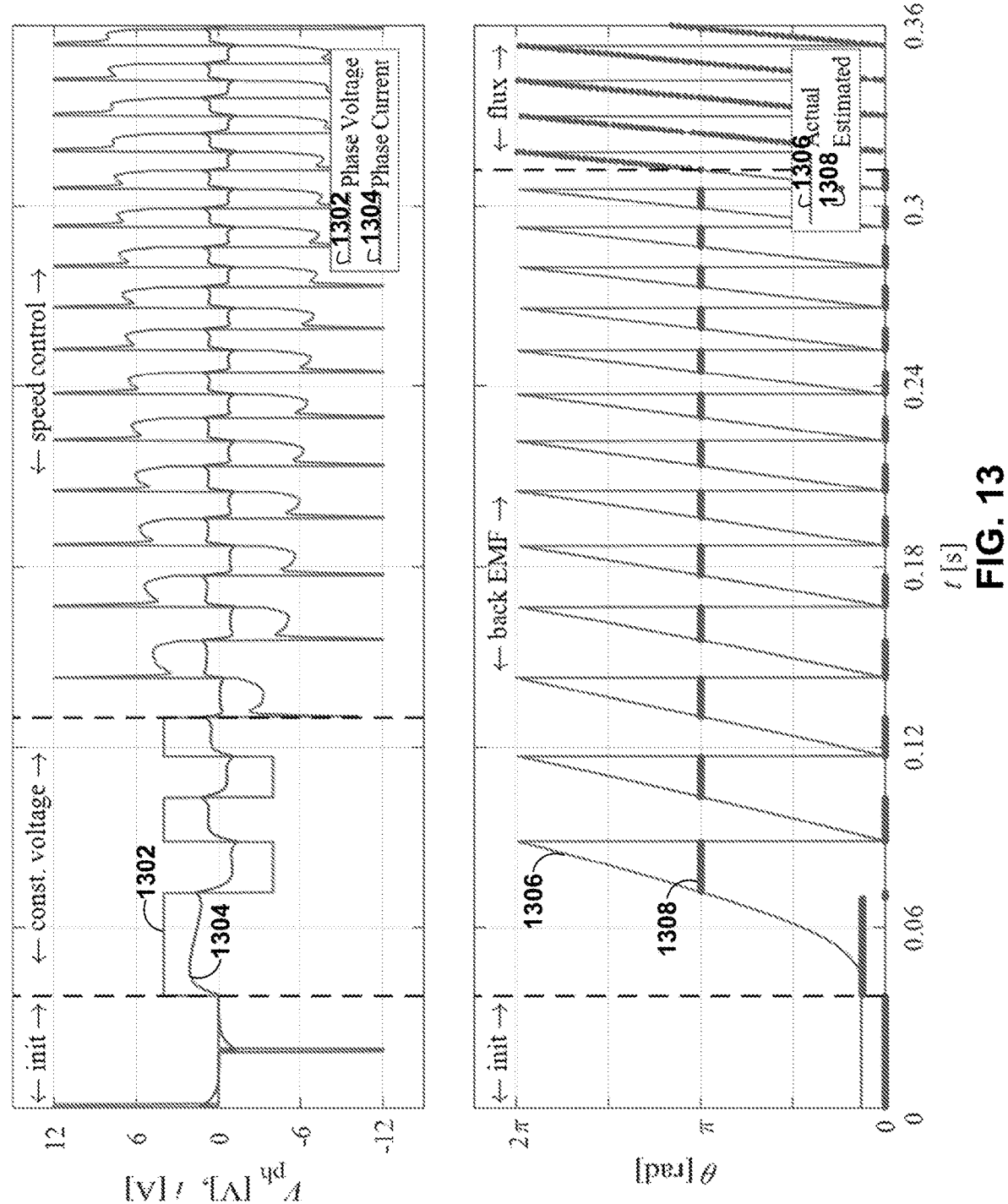
FIG. 13 is an illustration of various control and position estimation techniques, in accordance with one or more techniques of this disclosure.

FIG. 13 is an illustration of various control and position estimation techniques, in accordance with one or more techniques of this disclosure. For purposes of illustration only, the example operations are described below within the context of FIGS. 1-12. The abscissa axis of FIG. 13 is time in seconds (s) and the ordinate axis of FIG. 13 is phase voltage 1302 (e.g., voltage at a stator winding) in volts, phase current 1304 (e.g., current at the stator winding) in amperes, actual rotor position 1306 in radians, and estimated rotor position 1308 in radians.

FIG. 13 illustrates an example of three exemplary components of sensorless position detection (e.g., start-up control 222, back-emf observer control 206, flux observer control 208) transition. The various components of sensorless position detection may use different control and position estimation techniques as described herein. After controller circuit 110 detects the initial rotor angle ("init"), controller circuit 110 applies a constant start-up voltage as phase voltage 1302. During the first five commutations, the applied phase voltage 1302 is kept constant ("const. voltage") and then the current and speed controller are further employed ("speed control"). Finally, once flux observer control is ready, flux observer control is activated ("flux"). Although FIG. 13 illustrates multiple commutations during start-up control, in some examples, start-up control may include only one commutation.

The following examples may illustrate one or more aspects of the disclosure.

Example 1. A controller circuit for a brushless direct current (BLDC) motor, the controller circuit being configured to: estimate a rotor position of the BLDC motor; apply a constant start-up voltage to a stator winding of the BLDC motor using the estimated rotor position until a current at the stator winding corresponds to a local minimum current; in response to the current at the stator winding corresponding to the local minimum current, allow commutation of the current at the stator winding; calculate the rotor position in response to allowing the commutation of the current at the stator winding; and commutate the current at the stator winding using the calculated rotor position.

Example 2. The controller circuit of claim 1, wherein the controller circuit is configured to: determine the current at the stator winding corresponds to the local minimum current when a time derivative of the current at the stator winding corresponds to zero.

Example 3. The controller circuit of any combination of examples 1-2, wherein, to estimate the rotor position, the controller circuit is configured to estimate the rotor position using the current at the stator winding.

Example 4. The controller circuit of any combination of examples 1-3, wherein, to estimate the rotor position, the controller circuit is configured to: measure a first current sample at the stator winding in response to applying a first voltage pulse at the stator winding; and measure a second current sample at the stator winding in response to applying a second voltage pulse at the stator winding, wherein the second voltage pulse has an opposite polarity from the first voltage pulse.

Example 5. The controller circuit of any combination of examples 1-4, wherein, to apply the constant start-up voltage, the controller circuit is configured to apply the constant start-up voltage with the first polarity when the first current sample is greater than the second current sample and to apply the constant start-up voltage with a second polarity when the first current sample is not greater than the second current sample, and wherein the first polarity is opposite to the second polarity.

Example 6. The controller circuit of any combination of examples 1-5, wherein, to calculate the rotor position, the controller circuit is configured to: estimate a back electromotive force (back-emf) voltage using the current at the stator winding; and calculate the rotor position using the back-emf voltage; and wherein, to commutate the current at the stator winding, the controller circuit is configured to select a first polarity or a second polarity for the current at the stator winding using the calculated rotor position, wherein the first polarity is opposite to the second polarity.

Example 7. The controller circuit of any combination of examples 1-6, wherein, to calculate the rotor position, the controller circuit is configured to: determine the calculated rotor position corresponds to an electrical angle of 180 degrees in response to the back-emf voltage crossing zero when the back-emf voltage has the first polarity; and determine the calculated rotor position corresponds to an electrical angle of 0 degrees in response to the back-emf voltage crossing zero when the back-emf voltage has the second polarity; and wherein, to commutate the current at the stator winding, the controller circuit is configured to: select the first polarity for the current at the stator winding in response to determining the calculated rotor position corresponds to the electrical angle of 0 degrees; and select the second polarity for the current at the stator winding in response to determining the calculated rotor position corresponds to the electrical angle of 180 degrees.

Example 8. The controller circuit of any combination of examples 1-7, wherein, to calculate the rotor position, the controller circuit is configured to: generate a first flux sample in response to the calculated rotor position corresponding to an electrical angle of 0 degrees; generate a second flux sample in response to the calculated rotor position corresponding to an electrical angle of 180 degrees; and generate a compensation voltage using the first flux sample and the second flux sample.

Example 9. The controller circuit of any combination of examples 1-8, wherein, to generate the compensation voltage, the controller circuit is configured to: determine an average of the first flux sample and the second flux sample as input to a proportional-integral controller; and scale an output of the proportional-integral controller by a rotation speed of the BLDC motor.

Example 10. The controller circuit of any combination of examples 1-9, wherein, to calculate the rotor position, the controller circuit is configured to: estimate a back electromotive force (back-emf) voltage using the current at the stator winding; determine the calculated rotor position corresponds to the electrical angle of 180 degrees in response to the back-emf voltage crossing zero when the back-emf voltage has a first polarity; and determine the calculated rotor position corresponds to the electrical angle of 0 degrees in response to the back-emf voltage crossing zero when the back-emf voltage has a second polarity, wherein the first polarity is opposite to the second polarity.

Example 11. The controller circuit of any combination of examples 1-10, wherein, to calculate the rotor position, the controller circuit is configured to: continuously estimate a flux for the BLDC motor using the compensation voltage; and continuously calculate the rotor position using the flux, wherein generating the first flux sample is in response to the continuously estimated rotor position corresponding to the electrical angle of 0 degrees and wherein generating the second flux sample is in response to the continuously estimated rotor position corresponding to the electrical angle of 180 degrees.

Example 12. The controller circuit of any combination of examples 1-11, wherein the controller circuit is configured to: receive, from a current sensor, a measurement of the current at the stator winding.

Example 13. The controller circuit of any combination of examples 1-12, further comprising: a first switching module configured to selectively couple a first node of the stator winding to a supply node of a supply or a reference node of the supply; a second switching module configured to selectively couple a second node of the stator winding to the supply node or the reference node; and a driver configured to operate in a first state and a second state based on a control signal output by the controller circuit, wherein during the first state the driver is configured to drive the first switching module to couple the first node of the stator winding to the supply node and to drive the second switching module to couple the second node of the stator winding to the reference node, and wherein during the second state the driver is configured to drive the first switching module to couple the first node of the stator winding to the reference node and to drive the second switching module to couple the second node of the stator winding to the supply node.

Example 14. A method for controlling a brushless direct current (BLDC) motor, the method comprising: estimating, by a controller circuit, a rotor position of the BLDC motor; applying, by the controller circuit, a constant start-up voltage to a stator winding of the BLDC motor using the estimated rotor position until a current at the stator winding corresponds to a local minimum current; in response to the current at the stator winding corresponding to the local minimum current, allowing, by the controller circuit, commutation of the current at the stator winding; calculating, by the controller circuit, the rotor position in response to allowing the commutation of the current at the stator winding; and commutating, by the controller circuit, the current at the stator winding using the calculated rotor position.

Example 15. The method of example 14, further comprising: determining, by the controller circuit, the current at the stator winding corresponds to the local minimum current when a time derivative of the current at the stator winding corresponds to zero.

Example 16. The method of any combination of examples 14-15, wherein estimating the rotor position comprises estimating the rotor position using the current at the stator winding.

Example 17. The method of any combination of examples 14-16, wherein estimating the rotor position comprises: measuring a first current sample at the stator winding in response to applying a first voltage pulse at the stator winding; and measuring a second current sample at the stator winding in response to applying a second voltage pulse at the stator winding, wherein the second voltage pulse has an opposite polarity from the first voltage pulse.

Example 18. The method of any combination of examples 14-17, wherein applying the constant start-up voltage comprises applying the constant start-up voltage with a first polarity when the first current sample is greater than the second current sample and applying the constant start-up voltage with a second polarity when the first current sample is not greater than the second current sample, and wherein the first polarity is opposite to the second polarity.

Example 19. The method of any combination of examples 14-18, wherein calculating the rotor position comprises: estimating a back electromotive force (back-emf) voltage using the current at the stator winding; and calculating the rotor position using the back-emf voltage; and wherein commutating the current at the stator winding comprises selecting a first polarity or a second polarity for the current at the stator winding using the calculated rotor position, wherein the first polarity is opposite to the second polarity.

Example 20. A system comprising: a single-phase brushless direct current (BLDC) motor; a current sensor configured to generate a measurement of a current at a stator winding of the BLDC motor; a supply comprising a supply node and a reference node; a first switching module configured to selectively couple a first node of the stator winding to the supply node or the reference node; a second switching module configured to selectively couple a second node of the stator winding to the supply node or the reference node; a driver configured to operate in a first state and a second state, wherein during the first state the driver is configured to drive the first switching module to couple the first node of the stator winding to the supply node and to drive the second switching module to couple the second node of the stator winding to the reference node and wherein during the second state the driver is configured to drive the first switching module to couple the first node of the stator winding to the reference node and to drive the second switching module to couple the second node of the stator winding to the supply node; and a controller circuit configured to: estimate, with the driver, a rotor position of the BLDC motor; apply, with the driver, a constant start-up voltage to the stator winding using the estimated rotor position until the measurement of the current at the stator winding corresponds to a local minimum current; in response to the measurement of the current at the stator winding corresponding to the local minimum current, allow commutation of the current at the stator winding; calculate the rotor position in response to allowing the commutation of the current at the stator winding; and commutate, with the driver, the current at the stator winding using the calculated rotor position.

Various aspects have been described in this disclosure. These and other aspects are within the scope of the following claims.

The invention claimed is:

1. A controller circuit for a brushless direct current (BLDC) motor, the controller circuit being configured to:
   estimate an initial rotor position of the BLDC motor, wherein, to estimate the initial rotor position, the controller circuit is configured to measure a first current sample at a stator winding of the BLDC motor in response to applying a first voltage pulse at the stator winding and measure a second current sample at the stator winding in response to applying a second voltage pulse at the stator winding, wherein the second voltage pulse has an opposite polarity from the first voltage pulse;
   apply an initial voltage or an initial current at the stator winding of the BLDC motor based on the estimated initial rotor position of the BLDC motor;
   in response to the initial voltage or the initial current applied at the stator winding satisfying a predetermined condition, enable a commutation control of a current at the stator winding;
   calculate a rotor position in response to the enablement of the commutation control of the current at the stator winding; and
   commutate the current at the stator winding using the calculated rotor position.

2. The controller circuit of claim 1, wherein the controller circuit is configured to:
   apply the initial voltage at the stator winding of the BLDC motor until the current at the stator winding corresponds to a local minimum current; and
   in response to the current at the stator winding corresponding to the local minimum current, enable the commutation control of the current at the stator winding.

3. The controller circuit of claim 1, wherein the controller circuit is configured to:
   set a predetermined value of the initial current applied at the stator winding based on the estimated initial rotor position of the BLDC motor;
   apply the initial current at the stator winding for a predetermined time duration; and
   enable the commutation control of the current at the stator winding after the predetermined time duration has elapsed.

4. The controller circuit of claim 1,
   wherein the controller circuit is configured to apply an initial voltage with the first polarity when the first current sample is greater than the second current sample and to apply an initial voltage with a second polarity when the first current sample is not greater than the second current sample, and
   wherein the first polarity is opposite to the second polarity.

5. The controller circuit of claim 1, wherein the controller circuit is configured to receive, from a current sensor, a measurement of the current at the stator winding.

6. The controller circuit of claim 1, further comprising:
   a first switching module configured to selectively couple a first node of the stator winding to a supply node of a supply or a reference node of the supply;
   a second switching module configured to selectively couple a second node of the stator winding to the supply node or the reference node; and
   a driver configured to operate in a first state and a second state based on a control signal output by the controller circuit, wherein, during the first state, the driver is configured to drive the first switching module to couple the first node of the stator winding to the supply node and to drive the second switching module to couple the second node of the stator winding to the reference node, and wherein, during the second state, the driver is configured to drive the first switching module to couple the first node of the stator winding to the reference node and to drive the second switching module to couple the second node of the stator winding to the supply node.

7. A controller circuit for a brushless direct current (BLDC) motor, wherein the controller circuit is configured to:
   estimate an initial rotor position of the BLDC motor;
   apply an initial voltage at a stator winding of the BLDC motor based on the estimated initial rotor position of the BLDC motor until a current at the stator winding corresponds to a local minimum current;
   determine the current at the stator winding corresponds to the local minimum current when a time derivative of the current at the stator winding corresponds to zero;
   in response to the determination that the current at the stator winding corresponds to the local minimum current, enable a commutation control of the current at the stator winding;
   calculate a rotor position in response to the enablement of the commutation control of the current at the stator winding; and
   commutate the current at the stator winding using the calculated rotor position.

8. A controller circuit for a brushless direct current (BLDC) motor, the controller circuit being configured to:
   estimate an initial rotor position of the BLDC motor;
   apply an initial voltage or an initial current at a stator winding of the BLDC motor based on the estimated initial rotor position of the BLDC motor;
   in response to the initial voltage or the initial current applied at the stator winding satisfying a predetermined condition, enable a commutation control of a current at the stator winding;
   calculate a rotor position in response to the enablement of the commutation control of the current at the stator winding, wherein, to calculate the rotor position, the controller circuit is configured to:
     estimate a back electromotive force voltage using the current at the stator winding; and
     calculate the rotor position using the back electromotive force voltage; and
   commutate the current at the stator winding, wherein, to commutate the current at the stator winding, the controller circuit is configured to select a first polarity or a second polarity for the current at the stator winding using the calculated rotor position, wherein the first polarity is opposite to the second polarity.

9. The controller circuit of claim 8,
   wherein, to calculate the rotor position, the controller circuit is configured to:
     determine the calculated rotor position corresponds to an electrical angle of 180 degrees in response to the back electromotive force voltage crossing zero when the back electromotive force voltage has the first polarity; and
     determine the calculated rotor position corresponds to an electrical angle of 0 degrees in response to the back electromotive force voltage crossing zero when the back electromotive force voltage has the second polarity; and wherein, to commutate the current at the stator winding, the controller circuit is configured to:
- select the first polarity for the current at the stator winding in response to determining the calculated rotor position corresponds to the electrical angle of 0 degrees; and
- select the second polarity for the current at the stator winding in response to determining the calculated rotor position corresponds to the electrical angle of 180 degrees.

10. A controller circuit for a brushless direct current (BLDC) motor, the controller circuit being configured to:
- estimate an initial rotor position of the BLDC motor;
- apply an initial voltage or an initial current at a stator winding of the BLDC motor based on the estimated initial rotor position of the BLDC motor;
- in response to the initial voltage or the initial current applied at the stator winding satisfying a predetermined condition, enable a commutation control of a current at the stator winding;
- calculate a rotor position in response to the enablement of the commutation control of the current at the stator winding, wherein, to calculate the rotor position, the controller circuit is configured to:
  - generate a first flux sample in response to the calculated rotor position corresponding to an electrical angle of 0 degrees;
  - generate a second flux sample in response to the calculated rotor position corresponding to an electrical angle of 180 degrees; and
  - generate a compensation voltage using the first flux sample and the second flux sample; and
- commutate the current at the stator winding using the calculated rotor position.

11. The controller circuit of claim 10, wherein, to generate the compensation voltage, the controller circuit is configured to:
- determine an average of the first flux sample and the second flux sample as input to a proportional-integral controller; and
- scale an output of the proportional-integral controller by a rotation speed of the BLDC motor.

12. The controller circuit of claim 10, wherein, to calculate the rotor position, the controller circuit is configured to:
- estimate a back electromotive force voltage using the current at the stator winding;
- determine the calculated rotor position corresponds to the electrical angle of 180 degrees in response to the back electromotive force voltage crossing zero when the back electromotive force voltage has a first polarity; and
- determine the calculated rotor position corresponds to the electrical angle of 0 degrees in response to the back electromotive force voltage crossing zero when the back electromotive force voltage has a second polarity, wherein the first polarity is opposite to the second polarity.

13. The controller circuit of claim 10, wherein, to calculate the rotor position, the controller circuit is configured to:
- continuously estimate a flux for the BLDC motor using the compensation voltage; and
- continuously calculate the rotor position using the estimated flux, wherein the controller circuit is configured to generate the first flux sample in response to the continuously calculated rotor position corresponding to the electrical angle of 0 degrees, and wherein the controller circuit is configured to generate the second flux sample in response to the continuously calculated rotor position corresponding to the electrical angle of 180 degrees.

14. A method for controlling a brushless direct current (BLDC) motor, the method comprising:
- estimating an initial rotor position of the BLDC motor, wherein estimating the initial rotor position comprises measuring a first current sample at the stator winding in response to applying a first voltage pulse at the stator winding and measuring a second current sample at the stator winding in response to applying a second voltage pulse at the stator winding, wherein the second voltage pulse has an opposite polarity from the first voltage pulse;
- applying an initial voltage or an initial current at a stator winding of the BLDC motor based on the estimated initial rotor position of the BLDC motor;
- in response to the initial voltage or the initial current applied at the stator winding satisfying a predetermined condition, enabling a commutation control of a current at the stator winding;
- calculating a rotor position in response to enabling the commutation control of the current at the stator winding; and
- commutating the current at the stator winding using the calculated rotor position.

15. The method of claim 14, wherein applying the initial voltage or the initial current at the stator winding of the BLDC motor based on the estimated initial rotor position of the BLDC motor comprises:
- applying the initial voltage at the stator winding of the BLDC motor until the current at the stator winding corresponds to a local minimum current; and
- in response to the current at the stator winding corresponding to the local minimum current, enabling the commutation control of the current at the stator winding.

16. The method of claim 14, wherein applying the initial voltage or the initial current at the stator winding of the BLDC motor based on the estimated initial rotor position of the BLDC motor comprises:
- setting a predetermined value of the initial current applied at the stator winding based on the estimated initial rotor position of the BLDC motor;
- applying the initial current at the stator winding for a predetermined time duration; and
- enabling the commutation control of the current at the stator winding after the predetermined time duration has elapsed.

17. The method of claim 15, further comprising determining the current at the stator winding corresponds to the local minimum current when a time derivative of the current at the stator winding corresponds to zero.

18. The method of claim 14, further comprising applying an initial voltage with a first polarity when the first current sample is greater than the second current sample and applying an initial voltage with a second polarity when the first current sample is not greater than the second current sample, and wherein the first polarity is opposite to the second polarity.

19. The method of claim 14,
wherein calculating the rotor position comprises:

estimating a back electromotive force voltage using the current at the stator winding; and
calculating the rotor position using the back electromotive force voltage; and
wherein commutating the current at the stator winding comprises selecting a first polarity or a second polarity for the current at the stator winding using the calculated rotor position, wherein the first polarity is opposite to the second polarity.

20. A system comprising:
a single-phase brushless direct current (BLDC) motor;
a current sensor configured to generate a measurement of a current at a stator winding of the BLDC motor;
a supply comprising a supply node and a reference node;
a first switching module configured to selectively couple a first node of the stator winding to the supply node or the reference node;
a second switching module configured to selectively couple a second node of the stator winding to the supply node or the reference node;
a driver configured to operate in a first state and a second state, wherein, during the first state, the driver is configured to drive the first switching module to couple the first node of the stator winding to the supply node and to drive the second switching module to couple the second node of the stator winding to the reference node, and wherein, during the second state, the driver is configured to drive the first switching module to couple the first node of the stator winding to the reference node and to drive the second switching module to couple the second node of the stator winding to the supply node; and
a controller circuit configured to:
estimate an initial rotor position of the BLDC motor, wherein, to estimate the initial rotor position, the controller circuit is configured to measure a first current sample at the stator winding of the BLDC motor in response to applying a first voltage pulse at the stator winding and measure a second current sample at the stator winding in response to applying a second voltage pulse at the stator winding, wherein the second voltage pulse has an opposite polarity from the first voltage pulse;
apply an initial voltage or an initial current at the stator winding of the BLDC motor based on the estimated initial rotor position of the BLDC motor;
in response to the initial voltage or the initial current applied at the stator winding satisfying a predetermined condition, enable a commutation control of the current at the stator winding;
calculate a rotor position in response to the enablement of the commutation control of the current at the stator winding; and
commutate the current at the stator winding using the calculated rotor position.

* * * * *